(12) United States Patent
Kim et al.

(10) Patent No.: US 11,269,075 B2
(45) Date of Patent: Mar. 8, 2022

(54) HYBRID SENSOR SYSTEM AND METHOD FOR PROVIDING 3D IMAGING

(71) Applicant: SAMSUNG ELECTRONICS CO., LTD., Suwon-si (KR)

(72) Inventors: Kwang Oh Kim, Cerritos, CA (US); Yibing Michelle Wang, Temple City, CA (US); Radwanul Hasan Siddique, Pasadena, CA (US); Lilong Shi, Pasadena, CA (US); Chunji Wang, Pasadena, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/940,308

(22) Filed: Jul. 27, 2020

(65) Prior Publication Data

US 2021/0325541 A1    Oct. 21, 2021

Related U.S. Application Data

(60) Provisional application No. 63/012,000, filed on Apr. 17, 2020.

(51) Int. Cl.
*G01S 17/08* (2006.01)
*G01S 17/894* (2020.01)
(Continued)

(52) U.S. Cl.
CPC ........ *G01S 17/894* (2020.01); *G06K 9/00201* (2013.01); *G06T 7/20* (2013.01);
(Continued)

(58) Field of Classification Search
CPC .. G01S 17/894; H04N 5/379; H04N 5/36965; H04N 13/156; H04N 13/254;
(Continued)

(56) References Cited

U.S. PATENT DOCUMENTS 8,134,637 B2   3/2012  Rossbach et al.
8,648,702 B2   2/2014  Pala
(Continued)

FOREIGN PATENT DOCUMENTS

WO   WO2018218298 A1   12/2018
WO   WO2020033749 A1   2/2020

OTHER PUBLICATIONS

Chen, Bo Han, et al., "GaN Metalens for Pixel-Level Full-Color Routing at Visible Light," Nano Letters, vol. 17, 2017, pp. 6345-6352.
(Continued)

*Primary Examiner* — Howard D Brown, Jr.
(74) *Attorney, Agent, or Firm* — Lewis Roca Rothgerber Christie LLP

(57) ABSTRACT

Provided is a 3D depth sensing system and method of providing an image based on a hybrid sensing array. The 3D sensing system including a light source configured to emit light, a hybrid sensing array comprising a 2D sensing region configured to detect ambient light reflected from an object and a 3D depth sensing region configured to detect the light emitted by the light source and reflected from the object, a metalens on the hybrid sensing array, the metalens being configured to direct the ambient light reflected from the object towards the 2D sensing region, and to direct the light emitted by the light source and reflected from the object towards the 3D depth sensing region, and a processing circuit configured to combine 2D image information provided by the 2D sensing region and 3D information provided by the 3D depth sensing region to generate a combined 3D image.

20 Claims, 25 Drawing Sheets

(51) Int. Cl.

| | |
|---|---|
| *G06T 7/55* | (2017.01) |
| *G06T 7/521* | (2017.01) |
| *H04N 13/156* | (2018.01) |
| *H04N 13/254* | (2018.01) |
| *H04N 5/369* | (2011.01) |
| *G06K 9/00* | (2022.01) |
| *G06T 7/20* | (2017.01) |
| *G05D 1/00* | (2006.01) |
| *G05D 1/02* | (2020.01) |

(52) U.S. Cl.
CPC ............... *G06T 7/521* (2017.01); *G06T 7/55* (2017.01); *H04N 5/36965* (2018.08); *H04N 5/379* (2018.08); *H04N 13/156* (2018.05); *H04N 13/254* (2018.05); *G05D 1/0088* (2013.01); *G05D 1/0246* (2013.01); *G06T 2207/10028* (2013.01); *G06T 2207/30252* (2013.01)

(58) Field of Classification Search
CPC ...... G06K 9/00201; G06T 2207/10028; G06T 7/20; G06T 7/55; G06T 7/521; G06T 2207/30252; G05D 1/0088; G05D 1/0246
See application file for complete search history.

(56) References Cited

U.S. PATENT DOCUMENTS

| | | | |
|---|---|---|---|
| 9,608,027 | B2 | 3/2017 | Sun et al. |
| 9,628,735 | B2 | 4/2017 | Zhang et al. |
| 2016/0181295 | A1* | 6/2016 | Wan .................. H04N 5/33 348/164 |
| 2016/0373676 | A1* | 12/2016 | Zhang ............... H04N 5/374 |
| 2018/0107904 | A1* | 4/2018 | Yang Mao ......... G06K 9/6288 |
| 2019/0137856 | A1* | 5/2019 | Na .................. G01B 11/2522 |
| 2019/0383910 | A1* | 12/2019 | Dunn .................... G01S 17/10 |
| 2020/0057151 | A1 | 2/2020 | Finkelstein et al. |
| 2020/0081294 | A1* | 3/2020 | You .................. G02F 1/133606 |
| 2020/0116862 | A1* | 4/2020 | Xu ........................ G01S 17/89 |
| 2020/0259307 | A1* | 8/2020 | Sharma .................. H01S 5/183 |

OTHER PUBLICATIONS

EPO Extended European Search Report dated Jun. 7, 2021, issued in corresponding European Patent Application No. 20216077.6 (9 pages).

* cited by examiner

HYBRID SENSOR SYSTEM AND METHOD FOR PROVIDING 3D IMAGING

CROSS-REFERENCE TO RELATED APPLICATION

This application claims priority to and the benefit of U.S. Provisional Application No. 63/012,000, filed on Apr. 17, 2020, entitled "A hybrid photodiode and SPAD array and sensor system to improve 3D depth information," the entire content of which is incorporated by reference herein.

BACKGROUND

1. Field

Aspects of one or more embodiments of the present disclosure relate to a hybrid sensor system and method for 3D imaging.

2. Description of the Related Art

In recent years, applications that rely on computer vision such as advanced driver assistance systems ("ADAS"), autonomous driving applications, augmented reality ("AR"), virtual reality ("VR"), and the like have become more widely demanded. Different detection systems such as Light Detection and Ranging ("LiDAR"), cameras, and the like have been provided to support ADAS, autonomous driving applications, AR, VR, and the like. Such detection systems provide information to assist the applications in understanding, modifying, and acting on information from the real-world.

However, it can be difficult to meet the demands of ADAS, autonomous driving applications, AR, VR, and the like due to hardware and software limitations which may adversely impact resolution, detection range, speed, and/or stability. For example, it can be challenging to provide high resolution and high quality 3D depth information for ADAS and autonomous driving applications. As another example, low form-factor may be desirable for AR and VR applications where longer detection range (e.g., detection range over 10 meters) and mobility of the device may be useful.

Generally, to provide real-world information, multiple separate detection systems may be used. However, translating the data from these separate detection systems into a high quality 3D image may be difficult. For example, separate detection systems that provide a separate set of 2D image data and a separate set of 3D depth data may be used to provide a 3D image by aligning corresponding points from separate sets of 2D image data and 3D depth data. This process may consider several factors and/or calibrations which may take substantial computational resources. Moreover, misalignment or inability to align corresponding points between 2D image data and 3D depth data may undermine the effectiveness of the separate systems for computer vision applications.

The above information disclosed in this Background section is for enhancement of understanding of the background of the present disclosure, and therefore, it may contain information that does not constitute prior art.

SUMMARY

One or more example embodiments of the present disclosure are directed to a system and method for 3D imaging.

According to one embodiment of the present disclosure, there is provided a 3D sensing system. The 3D sensing system including a light source configured to emit light, a hybrid sensing array including a 2D sensing region configured to detect ambient light reflected from an object and a 3D depth sensing region configured to detect the light emitted by the light source and reflected from the object, a metalens on the hybrid sensing array, the metalens being configured to direct the ambient light reflected from the object towards the 2D sensing region, and to direct the light emitted by the light source and reflected from the object towards the 3D depth sensing region, and a processing circuit configured to combine 2D image information provided by the 2D sensing region and 3D information provided by the 3D depth sensing region to generate a combined 3D image.

The processing circuit is further configured to determine 2D image information of the object based on the 2D sensing region, determine 3D depth information of the object based on the 3D depth sensing region, and update the 2D image information of the object with the 3D depth information.

The 3D sensing system may further include a row decoder and a column amplifier, the row decoder and the column amplifier being stacked below the hybrid sensing array.

The metalens may be circular, cylindrical, rectangular, or square in shape and be polarization-independent.

The 2D sensing region may include one or more photodiodes and the 3D depth sensing region may include one or more APDs or SPADs.

The metalens may be configured to direct NIR light to the 3D depth sensing region.

The processing circuit may be further configured to detect the object based on the 2D image information, generate a region of interest based on coordinates of the object in the 2D image information, and illuminate the region of interest using the light source.

The processing circuit may be further configured to determine an identity of the object based on the 2D image information and 3D depth information, track the object based on 2D image information, and update the 2D image information with 3D depth information in response to a critical condition.

According to one embodiment of the present disclosure, there is provided a method of providing an image based on a hybrid sensing array. The method including emitting light from a light source, detecting, by a 2D sensing region of the hybrid sensing array, ambient light reflected from an object, detecting, by a 3D depth sensing region of the hybrid sensing array, the light emitted by the light source and reflected from the object towards the 3D depth sensing region, directing, by a metalens on the hybrid sensing array, ambient light towards the 2D sensing region, directing, by the metalens of the hybrid sensing array, light emitted by the light source and reflected from the object towards the 3D depth sensing region, and combining, by a processing circuit, 2D image information provided by the 2D sensing region and 3D information provided by the 3D depth sensing region to generate a combined 3D image.

The method may further include determining, by the processing circuit, 2D image information of the object based on the 2D sensing region, determining, by the processing circuit, 3D depth information of the object based on the 3D depth sensing region, and updating, by the processing circuit, the 2D image information of the object with the 3D depth information.

The hybrid sensing array detecting the ambient light and the light emitted by the light source may be stacked above a row decoder and a column amplifier.

The metalens directing ambient light towards the 2D sensing region and directing light emitted by the light source and reflected from the object towards the 3D depth sensing region may be circular, cylindrical, rectangular, or square in shape and may be polarization-independent.

The 2D sensing region may include one or more photodiodes to detect ambient light and the 3D depth sensing region includes APDs or SPADs to detect the light emitted by the light source and reflected off the object.

The directing, by the metalens on the hybrid sensing array, ambient light towards the 2D sensing region may include directing visible light towards the 2D sensing region, and the directing, by the metalens of the hybrid sensing array, light emitted by the light source and reflected from the object towards the 3D depth sensing region includes directing NIR light towards the 3D depth sensing region.

The method may further include detecting, by the processing circuit, the object based on the 2D image information, generating, by the processing circuit, a region of interest based on coordinates of the object in the 2D image information, and illuminating, by the processing circuit, the region of interest using the light source.

The method may further include determining, by the processing circuit, an identity of the object based on the 2D image information and 3D depth information, tracking, by the processing circuit, the object based on 2D image information, and updating, by the processing circuit, the 2D image information with 3D depth information in response to a critical condition.

According to one embodiment of the present disclosure, there is provided a 3D sensing system. The 3D sensing system including a light source configured to emit light, a 2D sensing region to detect visible light reflected from an object, a 3D depth sensing region to detect near infrared light reflected from the object, a metalens covering the 2D sensing region, the metalens being configured to direct visible light reflected from the object toward the 2D sensing region and to direct the light emitted by the light source and reflected from the object towards the 3D depth sensing region, and a processing circuit configured to determine 2D image information of the object based on the 2D sensing region, determine 3D depth information of the object based on the 3D depth sensing region, and update the 2D image information of the object with the 3D depth information.

The 3D sensing system may further include a row decoder and a column amplifier, the row decoder and the column amplifier being stacked below the 2D sensing region and the 3D depth sensing region.

The metalens may be circular, cylindrical, rectangular, or square in shape and may be polarization-independent.

The 2D sensing region may include one or more photodiodes and the 3D depth sensing region includes one or more SPADs or APDs.

BRIEF DESCRIPTION OF THE DRAWINGS

The above and other aspects and features of the present disclosure will become more apparent to those skilled in the art from the following detailed description of the example embodiments with reference to the accompanying drawings.

FIGS. 3A-3I are plan views of portions of hybrid sensing arrays, according to one or more embodiments of the present disclosure.

DETAILED DESCRIPTION

Figure 1:
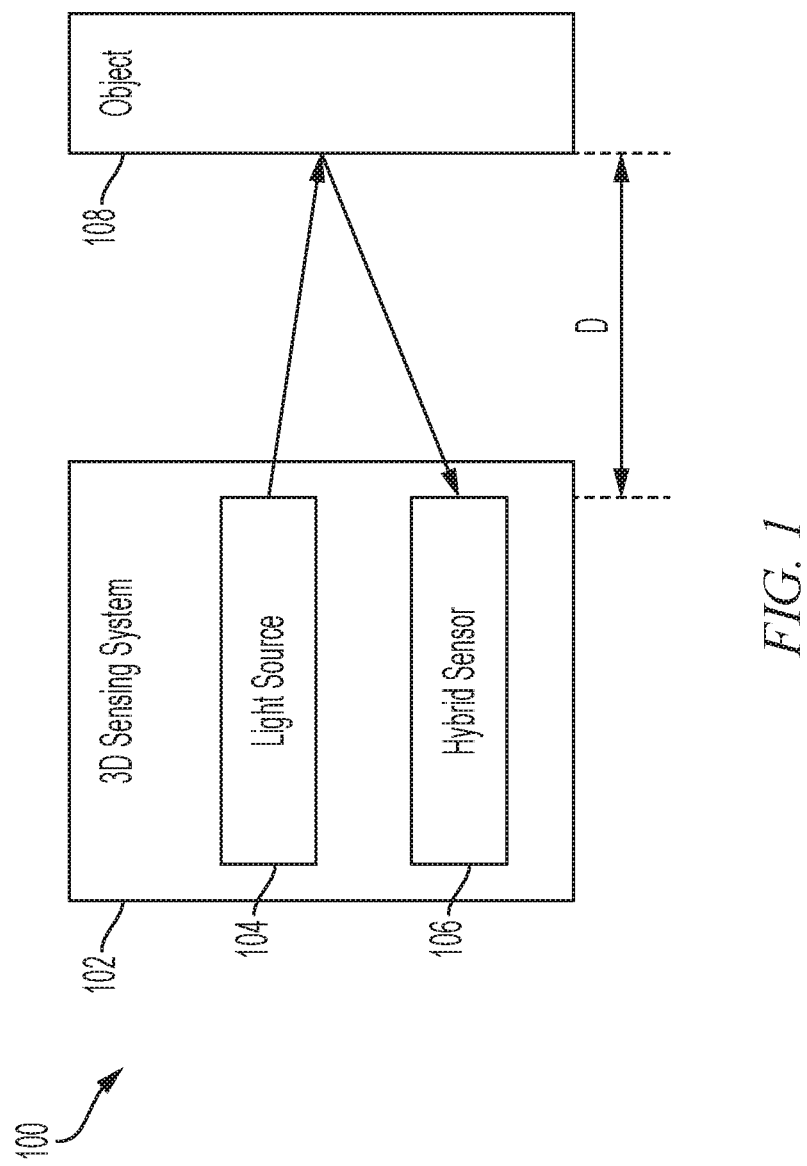
FIG. 1 is a block diagram of a 3D image system, according to one or more embodiments of the present disclosure.

Hereinafter, example embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof may not be repeated.

Generally, LiDAR systems, for example, such as direct time-of-flight (TOF) LiDAR systems, measure a distance (e.g., a depth) of an object therefrom by emitting light pulses (e.g., laser pulses) toward the object and measuring a time it takes for the light pulses to reflect off the object and to be detected by a sensor of the LiDAR system. Some LiDAR systems may use a 3D depth sensor including photodetectors such as a single-photon avalanche diode (SPAD) and/or an avalanche photodiode (APD) to detect photons for 3D depth information. Some LiDAR systems may also use a separate 2D image sensor including photodetectors such as a photodiode (PD) to detect light at certain wavelengths (e.g., visible wavelengths) for 2D information (e.g., a 2D image), and may fuse the 3D depth information with the 2D information by aligning corresponding points between different views of the 3D depth sensor and the 2D sensor. By fusing 3D depth information with 2D information, computer vision applications such as object detection for autonomous driving applications, ADAS, and/or the like may detect and identify objects in the real-world. Accordingly, the speed and resolution at which the fused 2D image and 3D depth data is provided may be critical for real-time computer vision applications.

However, using separate 2D image and 3D depth sensors leads to several challenges. For example, the 2D image and 3D depth sensors may have different fields of view (FOV), different resolutions, larger form factor, and/or the like. Therefore, the sensors may be undesirably bulky, precise calibration settings may be demanded, and substantial computing power may be dedicated to aligning corresponding points between 3D depth information and 2D image data.

Depending on the FOV of the separate 2D image sensor and the FOV of the separate 3D depth sensor, some points may not be capable of corresponding due to areas where the FOV do not overlap, obstructions of one of the sensors, and/or the like. Further, the separate 2D image sensor and the separate 3D depth sensor may have a large baseline distance (i.e., a distance between the 2D image sensor and the 3D depth sensor) which may make alignment between 2D and 3D information more difficult.

Individually, combining data from a separate 2D image sensor and a separate 3D depth sensor may result in issues that may need to be addressed during alignment. For example, a separate 3D depth sensor may have noise such as temporal, spatial, or flying pixels which could make fusing 2D image information and 3D depth information more difficult.

Moreover, separate 2D image and 3D depth sensors may scan all available sensing pixels to provide data for alignment. However, this process can take substantial computing resources and power while scanning all available sensing pixels may not be desired for the computer vision application. In the case of autonomous vehicles, increased power consumption may reduce available power which may reduce driving range based on a set amount of battery power. Further, increased computing demands associated with scanning more sensing pixels may reduce the speed at which calculations such as TOF may be completed.

Regardless, high resolution and high quality 3D depth information with a low form factor may be highly desirable for computer vision applications to detect objects in an environment at greater distances and provide enhanced mobility. In the case of ADAS and autonomous driving applications, increasing the distance at which an object may be detected reduces the risk posed by the object. Therefore, it may be desirable to detect objects up to a range of up to at least 100 meters to about 200 meters or more. In the case of VR and AR applications, low form factor may provide greater mobility, and high quality 3D depth information may be desirable to identify distant objects (e.g., objects more than 10 meters from the sensing system).

According to one or more embodiments of the present disclosure, a compact, monolithic hybrid sensor including a hybrid sensing array may be provided. The hybrid sensing array may include a 2D sensing region (e.g., a complementary metal-oxide-semiconductor ("CMOS") sensing region) for detecting visible features and a 3D depth sensing region (e.g., a SPAD or APD sensing region) for sensing depth. The 2D sensing region and the 3D depth sensing region of the hybrid sensing array may share the same or substantially the same FOV as each other. By sharing a FOV, calibration demands for the system may be reduced and alignment may be simplified.

In one or more embodiments, one or more metalenses positioned between the hybrid sensing array and external light may direct (or focus) visible light to the 2D sensing region and direct (or focus) near infrared ("NIR") light to the 3D depth sensing region to enhance visible light and NIR detection.

Further, a first plurality of sensing pixels including PDs of the 2D sensing region and a second plurality of sensing pixels including sensing pixels of the 3D depth sensing region may be arranged such that a high resolution 2D image updated or augmented with high quality 3D depth information according to a shared FOV may be provided. In other words, a combined 3D image may be provided. For example, in one or more embodiments, the 2D image data from the 2D sensing region may be used by a processing circuit to detect objects in a high resolution 2D view thereby allowing object detection at a greater distance. The processing circuit may update or argument the high resolution 2D image data with 3D depth information by mapping 3D depth information from the 3D depth sensing region onto the 2D image data.

In one or more embodiments of the present disclosure, the processing circuit may conserve power and reduce computational strain by applying a region of interest ("ROI") scanning mechanism to the 3D depth sensing region of a hybrid sensor. For example, an object detector of the processing circuit may use an algorithm to identify and track objects of interest ("OOI") based on a 2D image. Based on the identified and tracked OOI, in one or more embodiments, a ROI controller of the processing circuit may communicate with the sensing circuit such that a portion of the sensing pixels of the 3D depth sensing region (e.g., a portion of the SPADs or APDs of the 3D depth sensing region) provide 3D depth information to the processing circuit instead of all of the sensing pixels of the 3D depth sensing region. Further, the ROI controller of the processing circuit may, in one or more embodiments, communicate with a light source, directly or indirectly, to activate a portion of an array of vertical-cavity surface-emitting lasers ("VCSELs")) to illuminate the tracked OOI. In the case of ADAS and autonomous vehicle applications, for example, a pedestrian may be mobile in contrast to a tree which may be static, and therefore, the 3D depth information of the pedestrian may be provided using ROI scanning while 3D depth information of the tree may not be collected to save power and/or computational resources.

The above and other aspects and features of one or more example embodiments of the present disclosure will now be described in more detail with reference to the figures.

FIG. 1 is a block diagram 100 of a 3D sensing system 102, according to one or more embodiments of the present disclosure.

Referring to FIG. 1, according to one or more example embodiments of the present disclosure, a 3D sensing system 102 may acquire information corresponding to its surroundings in an environment. In one or more embodiments, the 3D sensing system includes a light source 104 (e.g., an array of VCSELs) and a hybrid sensor 106.

The hybrid sensor 106 may include a 2D sensing region configured to generate 2D information (e.g., 2D image information with or without color) based on ambient light and a 3D depth sensing region configured to generate 3D depth information according to TOF measurements based on light emitted from the light source 104.

For example, the 2D sensing region of the hybrid sensor 106 may detect ambient light reflected from one or more targets to generate 2D image information and the 3D depth sensing region of the hybrid sensor 106 may detect light emitted (e.g., a light pulse emitted) from the light source 104 and reflected back towards the hybrid sensor 106 (which may include one or more metalenses to direct the reflected light towards the 3D depth sensing region). According to the time elapsed (i.e., TOF) from emission of a light pulse from the light source 104 to detection of the reflected light pulse by the 3D depth sensing region, the 3D sensing system 102 may determine the distance D1 (e.g., the depth) to the surface of one or more objects 108.

In one or more embodiments, the 2D information may be independently used to detect and track one or more objects 108 located within a suitable proximity to the 3D sensing system 102 at high resolution. In one or more embodiments, the 3D depth information may be used to update the 2D information of the one or more tracked objects 108 to provide a high-resolution 2D image supplemented or augmented with 3D depth information.

Accordingly, the 3D sensing system 102 may identify and track one or more objects 108 in an environment at high resolution in 2D using the hybrid sensor 106, and may augment or update 2D information corresponding to the one or more objects with 3D depth information using the hybrid sensor 106. By detecting the one or more objects 108 at high resolution in 2D, the 3D sensing system 102 may increase objection detection distance and may improve depth estimation for the detected object.

Figure 2A:
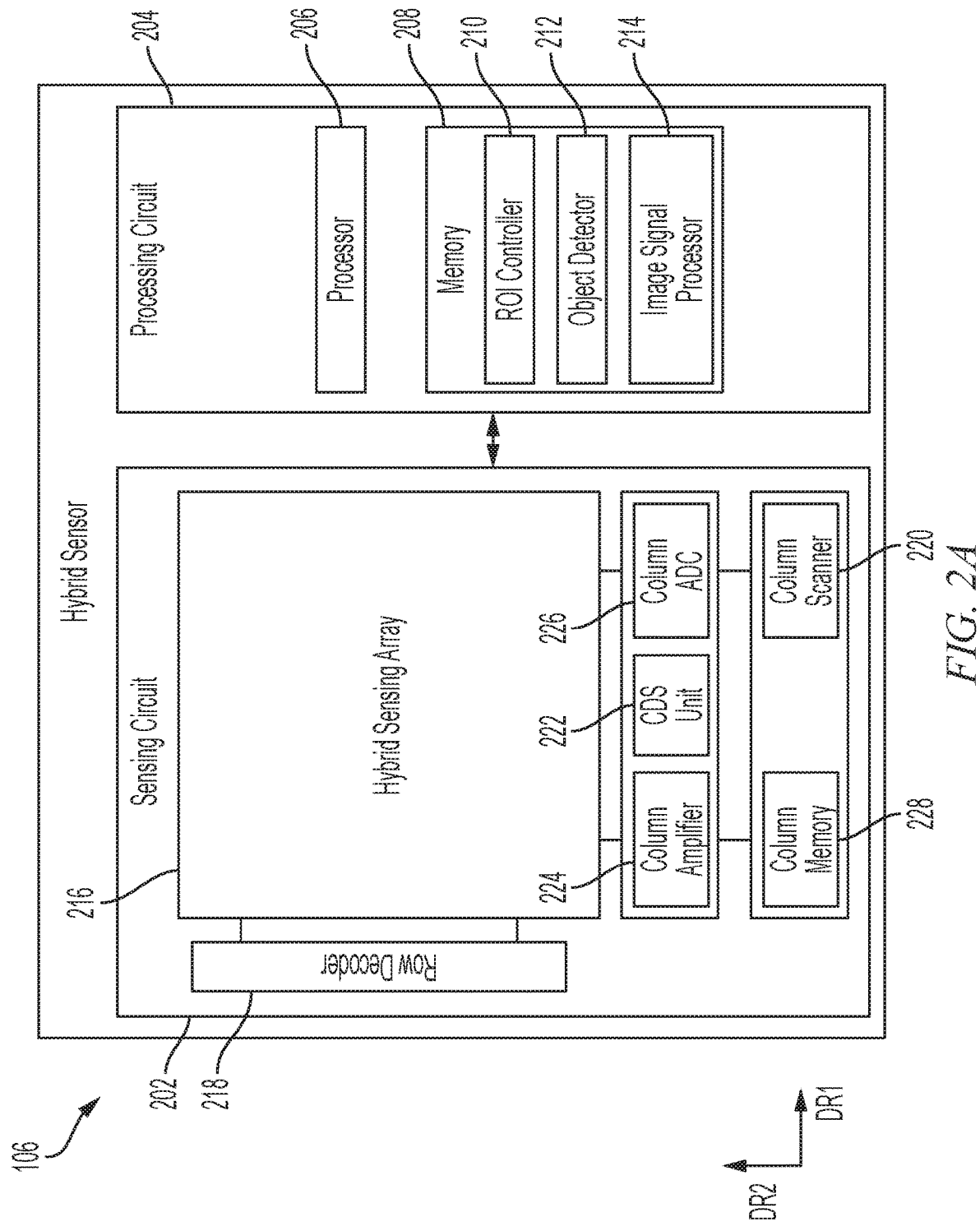
FIG. 2A is a block diagram including a hybrid sensor, according to one or more embodiments of the present disclosure.
Figure 2B:
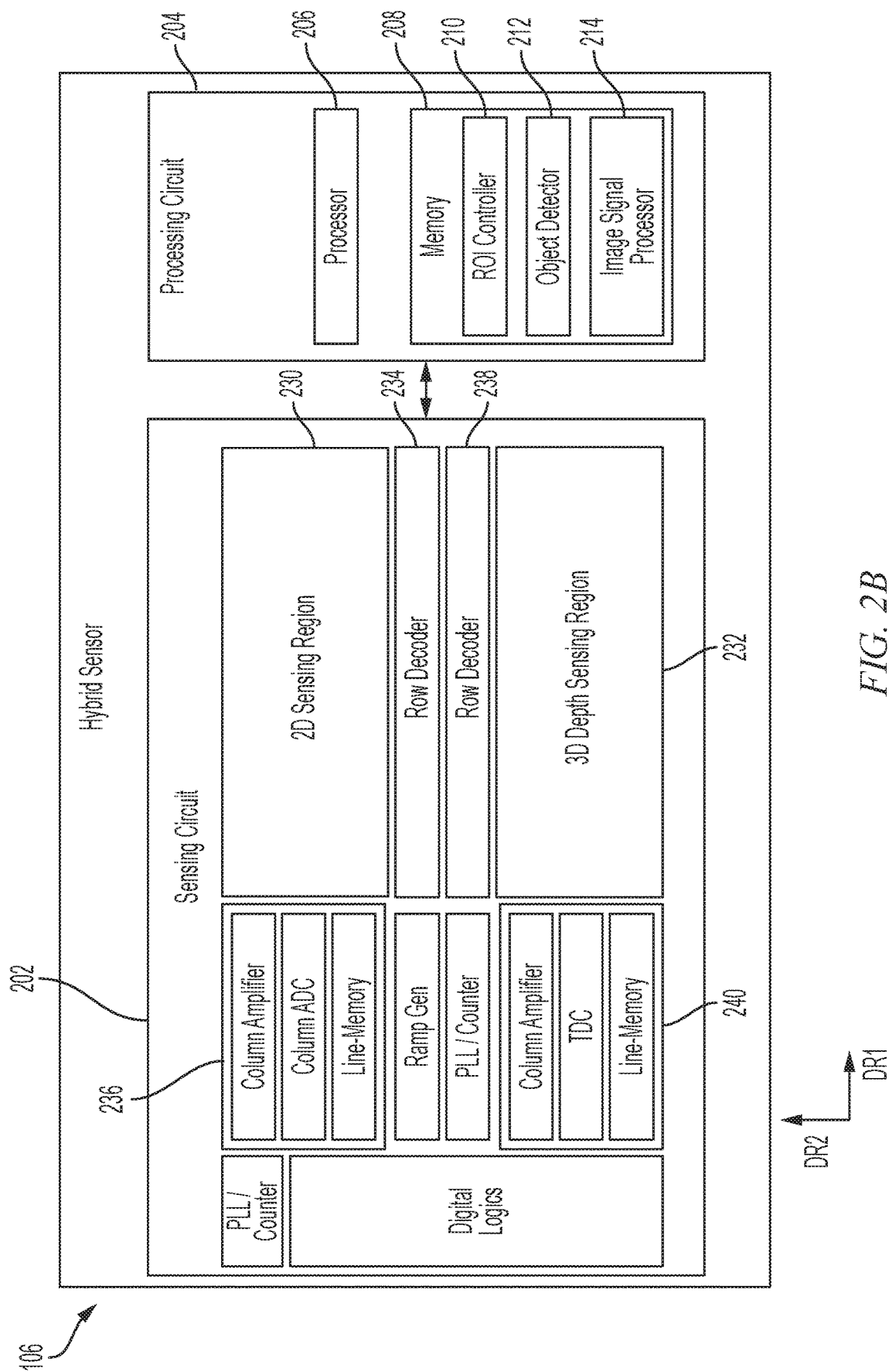
FIG. 2B is a block diagram including a hybrid sensor, according to one or more embodiments of the present disclosure.

FIG. 2A is a block diagram including a hybrid sensor 106, according to one or more embodiments of the present disclosure. FIG. 2B is a block diagram including a hybrid sensor, according to one or more embodiments of the present disclosure.

Referring to FIGS. 2A-2B, according to one or more example embodiments of the present disclosure, a hybrid sensor 106 includes a sensing circuit 202 for detecting light and a processing circuit 204 including a processor 206 and memory 208. The processor 206 may be implemented as a general purpose processor, an application specific integrated circuit (ASIC), one or more field programmable gate arrays (FPGAs), a group of processing components, or other suitable electronic processing components. The memory 208 (e.g., memory, memory unit, storage device, and/or the like) may include one or more devices (e.g., RAM, ROM, Flash memory, hard disk storage, and/or the like) for storing data and/or computer code for completing or facilitating the various processes described in the present application. The memory 208 may be or include volatile memory or non-volatile memory. The memory 208 may include database components, object code components, script components, or any other type of information structure for supporting the various activities and information structures described in the present application. According to an example embodiment, the memory 208 may be communicably connected to the processor 206 via the processing circuit 204, and includes computer code for executing (e.g., by the processing circuit 204 and/or the processor 206) one or more processes described herein.

As shown in FIGS. 2A-2B, the processing circuit 204 may be implemented within the hybrid sensor 106 as an internal processing circuit 204 of the hybrid sensor 106. However, the present disclosure is not limited thereto. In one or more embodiments, the functions of the processing circuit 204 may be separated or shared across a plurality of local processing circuits (e.g., the processing circuit 204 of the hybrid sensor 106 and another processing circuit of the 3D sensing system 102 which may be separate from the hybrid sensor 106). In one or more embodiments, the processing circuit of the 3D sensing system 102 may, for example, control functions of the 3D sensing system 102 (e.g., control functions of a motor vehicle) and communicate with the processing circuit 204 of the hybrid sensor 106. Therefore, in one or more embodiments, the processing circuit 204 of the hybrid sensor 106 may offload some functions that may be performed by the processing circuit of the 3D sensing system 102 thereby freeing the processing circuit of the 3D sensing system 102 to perform other functions.

Although one or more local processing circuits are described as performing the functions described in the present disclosure, the present disclosure is not limited thereto. For example, in other embodiments, the processing circuit 204 or one or more components thereof (e.g., components executing instructions in memory 208 to perform the methods described in the present disclosure) may be distributed across multiple servers or computers (e.g., that can exist in distributed locations).

In one or more embodiments, the processing circuit 204 may execute instructions in memory 208 to function as an image signal processor 214, an object detector 212, and/or a ROI controller 210.

The image signal processor 214 may provide or reconstruct 2D images and/or 3D images using data from the sensing circuit 202. In one or more embodiments, the image signal processor 214 provides or reconstructs 2D images by interpolating missing 2D image sensing data. The image signal processor 214 may provide or reconstruct 3D images by interpolating missing 3D depth sensing data and applying 3D depth information to the provided or reconstructed 2D image according to an algorithm to provide a high resolution 2D image supplemented, assisted, or updated with 3D depth information (i.e., a 3D image).

In one or more embodiments, the image signal processor 214 may improve 3D quality using the 2D image. For example, the image signal processor 214 may detect one or more OOI using the high-resolution 2D image, and may direct 3D depth sensing towards a region of interest (ROI) where the OOI may be detected. In this case, the 2D image may be used to supplement and/or verify the depth information of the 3D image, for example, such as filling missing 3D information of the OOI consistent with the 2D information.

The object detector 212 may use an algorithm including a neural-network based object detection system to detect and track objects in the 2D image data based on data from the 2D sensing region. In one or more embodiments, the object detector 212 may track objects in the 2D image and update specifically the regions (e.g., the ROI) of the tracked objects with 3D information (e.g., 3D depth information) based on ROI scanning.

The ROI controller 210 may use object detector 212 tracking information to interact with the sensing circuit 202 and/or a light source 104 to implement ROI based 3D sensing. For example, the ROI controller 210 may transmit signals to the sensing circuit 202 such that the row decoder 218 and/or the column scanner 220 perform either normal or ROI based scans according to row and column control logic. In one or more embodiments, the ROI controller 210 may use tracking information from the object detector 212 to direct a light source to illuminate specifically one or more OOI. For example, the ROI controller may transmit instructions to activate only a portion of the array of VCSELs of the light source directed toward the one or more tracked OOI. Therefore, battery power consumption may be reduced.

Accordingly, the image signal processor 214, object detector 212, and the ROI controller 210 enable high resolution, high quality 3D images including object identification and tracking with ROI-based scanning of tracked objects.

Referring to FIG. 2A, in one or more embodiments, the sensing circuit 202 of the hybrid sensor 106 includes a hybrid sensing array 216 including a 2D sensing region and a 3D depth sensing region. The 2D sensing region includes a first plurality of sensing pixels arranged into an array of lines forming columns and rows, and the 3D depth sensing region includes a second plurality of sensing pixels arranged into an array of lines forming columns and rows. The rows may extend in a first direction DR1 and the columns may extend in a second direction DR2 crossing the first direction DR1.

Each of the first plurality of sensing pixels may include a PD and each of the second plurality of sensing pixels may include a SPAD or APD. In one or more embodiments, each of the PDs of the 2D sensing region may detect red light, green light, or blue light, and each of the SPADs or APDs may detect near infrared light (i.e., light having a wavelength between 0.8 micrometers and about 1 micrometers, such as 904 nanometers or 940 nanometers). However, the present disclosure is not limited thereto. For example, one or more of the PDs of the 2D sensing region may detect any suitable colors of light in the visible spectrum to NIR spectrum (e.g., about 0.4 to about 0.8 micrometer), and one or more of the sensing pixels of the 3D depth sensing region may detect any suitable spectrum of light (e.g., wavelengths of light greater than 0.8 micrometers, such as 904 nanometers or 940 nanometers) for measuring TOF based on the light source 104. In the case of the 2D sensing region, any suitable arrangement may be used, for example, the 2D sensing region may include one or more of red, green, and blue sensing pixels, one or more of red and clear sensing pixels, one or more clear sensing pixels, or one or more monochrome sensing pixels.

In one or more embodiments, the sensing pixels of the 2D sensing region and the sensing pixels of the 3D depth sensing region may be interwoven (e.g., interwoven in a checked arrangement as shown in the embodiments of FIGS. 3A-3D or interwoven in a striped arrangement as shown in the embodiments of FIGS. 3E-3H) as shown and described in more detail with reference to FIG. 3A-3H below. In other words, each of the sensing pixels of the 3D depth sensing region may be directly adjacent to one or more sensing pixels of the 2D sensing region such that a sensing pixel of the 2D sensing region may be arranged between sensing pixels of the 3D depth sensing region in the first direction DR1 or the second direction DR2, or a sensing pixel of the 3D depth sensing region may be arranged between two sensing pixels of the 2D sensing region in the first direction DR1 or the second direction DR2. However, the present disclosure is not limited thereto. For example, the 2D sensing region and the 3D depth sensing region may be in a side-by-side arrangement as shown in the embodiments of FIGS. 2B, 3I, 6B, and 7A-7B.

Referring to FIG. 2B, in one or more embodiments, the sensing circuit 202 of the hybrid sensor 106 includes a hybrid sensing array including a 2D sensing region 230 and a 3D depth sensing region 232 in a side-by-side arrangement. The 2D sensing region 230 includes a first plurality of sensing pixels arranged into an array of lines forming columns and rows, and the 3D depth sensing region 232 includes a second plurality of sensing pixels arranged into an array of lines forming columns and rows. The rows may extend in a first direction DR1 and the columns may extend in a second direction DR2 crossing the first direction DR1.

Each of the first plurality of sensing pixels may include a PD and each of the second plurality of sensing pixels may include a SPAD or APD. In one or more embodiments, each of the PDs of the 2D sensing region 230 may detect red light, green light, or blue light, and each of the SPADs or APDs may detect near infrared light. However, the present disclosure is not limited thereto. For example, one or more of the PDs of the 2D sensing region 230 may detect any suitable colors of light in the visible spectrum to NIR spectrum (e.g., about 0.4 to about 0.8 micrometer), and one or more of the sensing pixels of the 3D depth sensing region 232 may detect any suitable spectrum of light (e.g., wavelengths of light greater than 0.8 micrometers, such as 904 nanometers or 940 nanometers) for measuring TOF based on the light source 104. In the case of the 2D sensing region 230, any suitable arrangement may be used, for example, the 2D sensing region 230 may include one or more of red, green, and blue sensing pixels, one or more of red and clear sensing pixels, one or more clear sensing pixels, or one or more monochrome sensing pixels.

In one or more embodiments, one or more metalenses may be positioned on or above the hybrid sensing arrays in the embodiments of FIGS. 2A-2B such that light incident on the one or more metalenses may be directed to different sensing regions according to the wavelength of the incident light. For example, light in the visible spectrum (e.g., red light, green light, blue light, and the like) may be directed (or focused) by nanostructures of the one or more metalenses to a sensing pixel of the 2D sensing region while light in the NIR spectrum may be directed (or focused) towards a sensing pixel of the 3D depth sensing region. Accordingly, the one or more metalenses improve the ability of the sensing pixels of the hybrid sensing array to detect inbound light.

Referring to FIG. 2A, in one or more embodiments, a row decoder 218 and a column scanner 220 may be used to address sensing pixels of the hybrid sensor 106. The row decoder 218 and/or the column scanner 220 may receive and output driving signals such that select sensing pixels may detect incident light and may output a sensing signal in response to the detected light. Sensing signals from sensing pixels in a pixel row may be stored in a column memory 228 prior to being read out sequentially to, for example, the processing circuit 204. In one or more embodiments, the sensing circuit 202 may provide signals to the row decoder 218 and/or column scanner 220 in accordance with signals from the ROI controller 210 of the processing circuit 204 to perform normal (e.g., general scanning) or ROI based 3D scanning.

In one or more embodiments, the sensing circuit 202 includes a column amplifier 224 for amplifying signal, a column analog to digital converter ("ADC") 226, and a correlated double sampling ("CDS") circuit 222. The column amplifier amplifies from signal of the sensing pixel to the ADC with CDS to provide a readout signal to the processing circuit 204. In one or more embodiments, the circuit providing the readout signal and/or the row and column control logic may be shared between the 2D sensing region and the 3D depth sensing region. However, the present disclosure is not limited thereto. For example, the readout signal and/or the row and column control logic may be supplied by two separate circuits connected to the 2D sensing region and the 3D depth sensing region respectively as shown in FIG. 2B.

Referring to FIG. 2B, the 2D sensing region 230 may be connected to a first circuit including a row decoder 234 and column circuitry 236 including a column amplifier with CDS function, column ADC with digital double sampling ("DDS") function, and line-memory block. The 3D depth sensing region 232 may be connected to a second circuit including a row decoder 238 and column circuitry 240 including a column amplifier if it is needed, time to digital converter ("TDC"), and line-memory block. In one or more embodiments, the first circuit and the second circuit communicate with or include a phase-locked loop ("PLL"), counter that may be gray counter or binary counter, ramp generator, and digital logics (e.g., digital logics for reconstructing 2D and 3D images) of the sensing circuit 202 to provide 2D image data and 3D depth information. Accordingly, as shown in FIG. 2B, in one or more embodiments, the first circuit and the second circuit may be separate from each other such that separate readout and separate row and column control logics are provided.

Referring to FIGS. 2A-2B, in one or more embodiments, the hybrid sensing array and other blocks such as, for example, the row decoder, CDS circuit, column amplifier, the column ADC, the column memory, the column scanner, line-memory, TDC, PLL, counter, ramp generator, digital logics, the processing circuit 204, components of the processing circuit 204, and/or the like may be implemented in the same package (e.g., the same die) and/or may be part of a stacked structure (e.g., a stacking die).

In one or more embodiments, the hybrid sensing array and the other blocks may be side-by-side in the same package (e.g., the same die). In other words, the hybrid sensing array and the other blocks may not overlap with each other in a plan view and may be connected using conductive components (e.g., conductive traces and/or the like).

In one or more embodiments, the hybrid sensing array and the other blocks may be part of a stacked structure where the one or more of the other blocks may be below the hybrid sensing array. The other blocks may be connected to the hybrid sensing array and/or each other using conductive components (e.g., hybrid bonding, through silicon-via ("TSV"), and/or the like).

FIGS. 3A-3I are plan views of portions of hybrid sensing arrays 300*a*, 300*b*, 300*c*, 300*d*, 300*e*, 300*f*, 300*g*, 300*h*, 300*i* according to one or more embodiments of the present disclosure.

Referring to FIGS. 3A-3D, the 2D sensing region includes a plurality of sensing pixels (e.g., one or more green sensing pixels 301 configured to detect a green color, one or more red sensing pixels 302 configured to detect a red color, and one or more blue sensing pixels 303 configured to detect a blue color). In the illustrated embodiments, the 3D depth sensing region includes one or more sensing pixels 304 configured to detect NIR light. The sensing pixels 301, 302, 303 of the 2D sensing region and the sensing pixels 304 of the 3D depth sensing region may be interwoven in various suitable configurations. In one or more embodiments, the 2D sensing region includes a first sensing pixel row 305 with alternating green sensing pixels 301 and red sensing pixels 302, and a second sensing pixel row 307 including alternating blue sensing pixels 303 and green sensing pixels 301. The first sensing pixel row 305 may be directly adjacent to the second sensing pixel row 307 to form 2×2 square segments including two green sensing pixels 301, one red sensing pixel 302, and one blue sensing pixel 303. The 2×2 segments may be repeated in the row direction (e.g., the first direction DR1) and the column direction (e.g., the second direction DR2 crossing the first direction DR1) to form a Bayer image. However, the present disclosure is not limited hereto. For example, the 2D sensing region may include sensing pixels arranged in any suitable shape with any suitable arrangement of color sensing pixels to fit other image schemes (e.g., a monochrome, red and clear, or clear image scheme).

According to one or more embodiments of the present disclosure, a ratio between sensing pixels of the 3D depth sensing region to a sensing pixel of the 2D sensing region may suitably vary. For example, in one or more embodiments, the ratio between a sensing pixel of the 3D depth sensing region to a sensing pixel of the 2D sensing region may be 1:1 (e.g., one sensing pixel including a SPAD to one monochrome sensing pixel), and in other embodiments, the ratio between a sensing pixel of the 3D depth sensing region to a sensing pixel of the 2D sensing region may be more than 1:1 (e.g., one sensing pixel 304 per group of red, green, and blue sensing pixels 301, 302, 303 as shown in FIGS. 3A-3D). The ratio of sensing pixels 304 of the 3D depth sensing region to sensing pixels 301, 302, 303 of the 2D sensing region may affect the resolution of corresponding data in an interwoven arrangement as shown in FIGS. 3A-3H. For example, increasing the number of sensing pixels 301, 302, 303 of the 2D sensing region per sensing pixels 304 of the 3D depth sensing region improves the resolution of the 2D sensing data while decreasing the resolution of 3D depth sensing data. Referring to FIGS. 3A-3D different ratios of sensing pixels 304 of the 3D depth sensing region to sensing pixels 301, 302, 303 of the 2D sensing region may be provided to balance a high resolution 2D image and minimum resolution 3D depth information that make possible to detect minimum size of object.

In one or more embodiments of the present disclosure, a ratio of an area occupied by a sensing pixel 304 of the 3D depth sensing region to an area occupied by a sensing pixel 301, 302, 303 of the 2D sensing region may be 1:4 as shown in the embodiments of FIGS. 3A-3D. However, the present disclosure is not limited thereto. For example, the ratio of the area occupied by a sensing pixel 304 of the 3D depth sensing region to the ratio of the area occupied by a sensing pixel 301, 302, 303 of the 2D sensing region may suitably vary (e.g., an area ratio of 1:1 or an area ratio greater than 1:1).

Figure 3A:
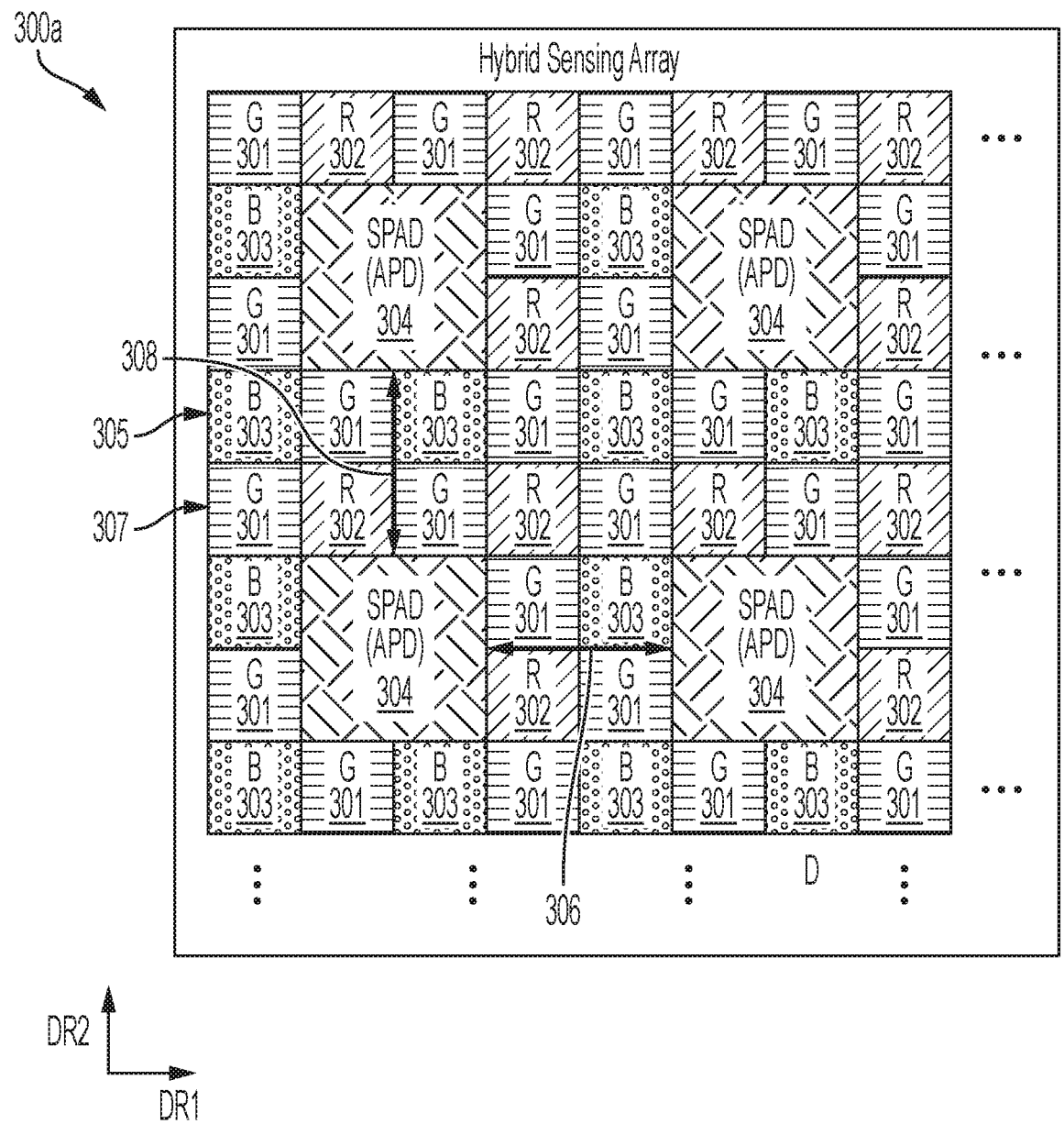

As shown in FIG. 3A, sensing pixels 301, 302, 303 of the 2D sensing region may be interrupted (or displaced) by sensing pixels 304 of the 3D depth sensing region such that the 2D sensing region and the 3D depth sensing region may be interwoven. In other words, a sensing pixel 304 of the 3D depth sensing region may be present instead of one or more sensing pixels 301, 302, 303 of the 2D sensing region according to a pattern of the sensing pixel column and/or sensing pixel row of the 2D sensing region. In one or more embodiments, the sensing pixels 304 of the 3D depth sensing region may be repeated at a first interval 306 in in a row direction (e.g., first direction DR1) and a second interval 308 in a column direction (e.g., second direction DR2). In this case, the first interval 306 and the second interval 308 may be equal to each other, and therefore, the sensing pixels 304 of the 3D depth sensing region may have a square-shape arrangement. In the embodiment shown in FIG. 3A, the ratio of sensing pixels 304 of the 3D depth sensing region to sensing pixels 301, 302, 303 of the 2D sensing region may be 1:12 and each sensing pixels 304 of the 3D depth sensing region may be separated from another sensing pixel 304 of the 3D depth sensing region by two of sensing pixels 301, 302, 303 of the 2D sensing region. However, the present disclosure is not limited thereto. For example, the sensing pixels 304 of the 3D depth sensing region may be separated from each other by any suitable number of sensing pixels 301, 302, 303 of the 2D sensing region with a corresponding effect on the ratio of sensing pixels 304 of the 3D depth sensing region to sensing pixels 301, 302, 303 of the 2D sensing region.

Figure 3B:
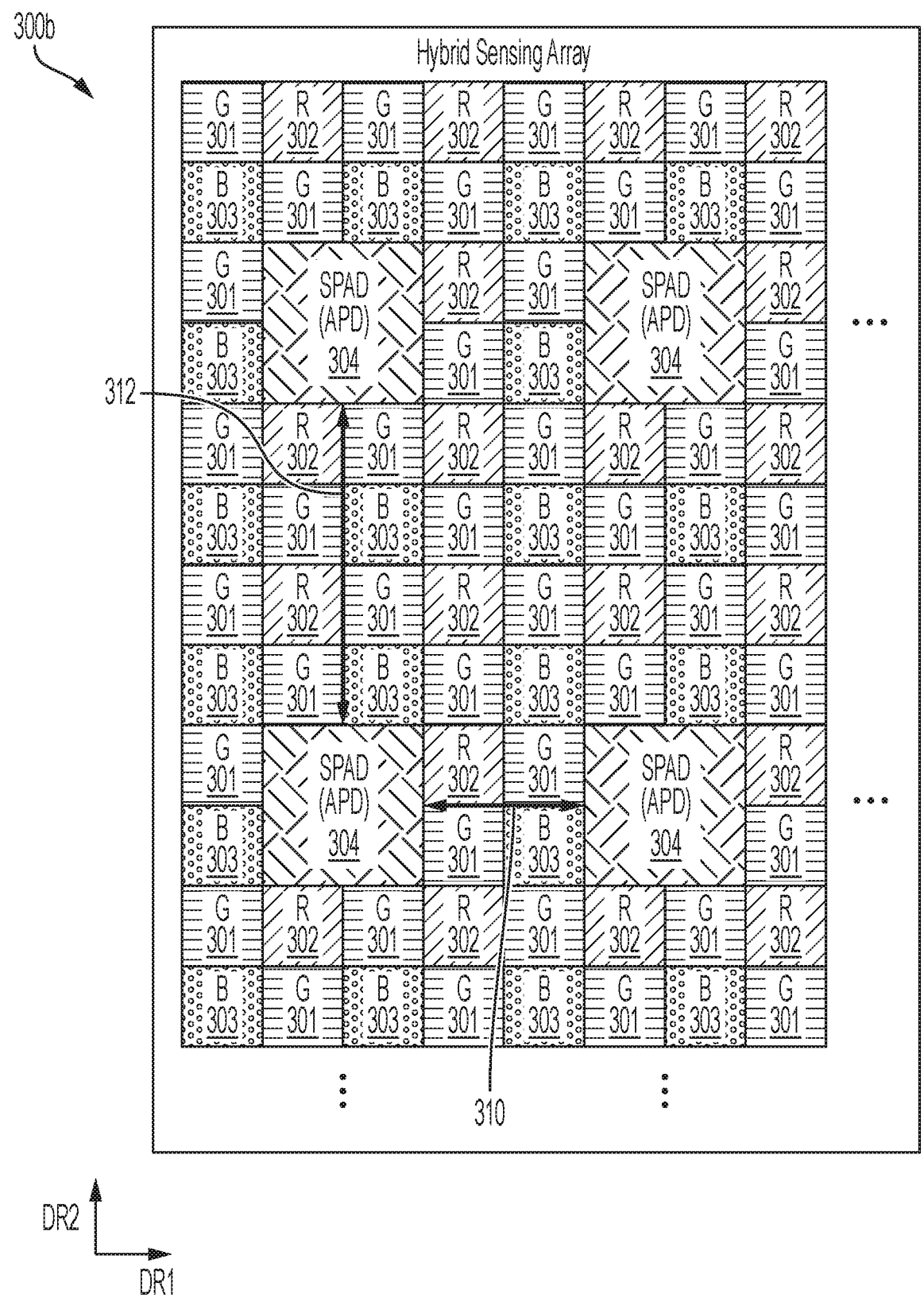

As shown in FIG. 3B, in one or more embodiments, the sensing pixels 304 of the 3D depth sensing region may be repeated for a row direction (e.g., first direction DR1) and a column direction (e.g., second direction DR2) at a third interval 310 in in a row direction (e.g., first direction DR1) and a fourth interval 312 in a column direction (e.g., second direction DR2). In this case, the third interval 310 and the fourth interval 312 may be different from each other, and therefore, the sensing pixels 304 of the 3D depth sensing region may have a rectangular-shape arrangement. In the embodiment shown in FIG. 3B, the ratio of sensing pixels 304 of the 3D depth sensing region to sensing pixels of the 2D sensing region may be 1:20 and each of the sensing pixels 304 of the 3D depth sensing region may be separated from another sensing pixel 304 of the 3D depth sensing region by two of sensing pixels 301, 302, 303 of the 2D sensing region in the row direction (e.g., the first direction DR1) and four of sensing pixels 301, 302, 303 of the 2D sensing region in the column direction (e.g., the second direction DR2). However, the present disclosure is not limited thereto. For example, the sensing pixels 304 of the 3D depth sensing region may be separated from each other by any suitable number of sensing pixels 301, 302, 303 of the 2D sensing region in the row direction (e.g., the first direction DR1) and/or the column direction (e.g., the second direction DR2) with a corresponding effect on the ratio of sensing pixels 304 of the 3D depth sensing region to sensing pixels 301, 302, 303 of the 2D sensing region.

Figure 3C:
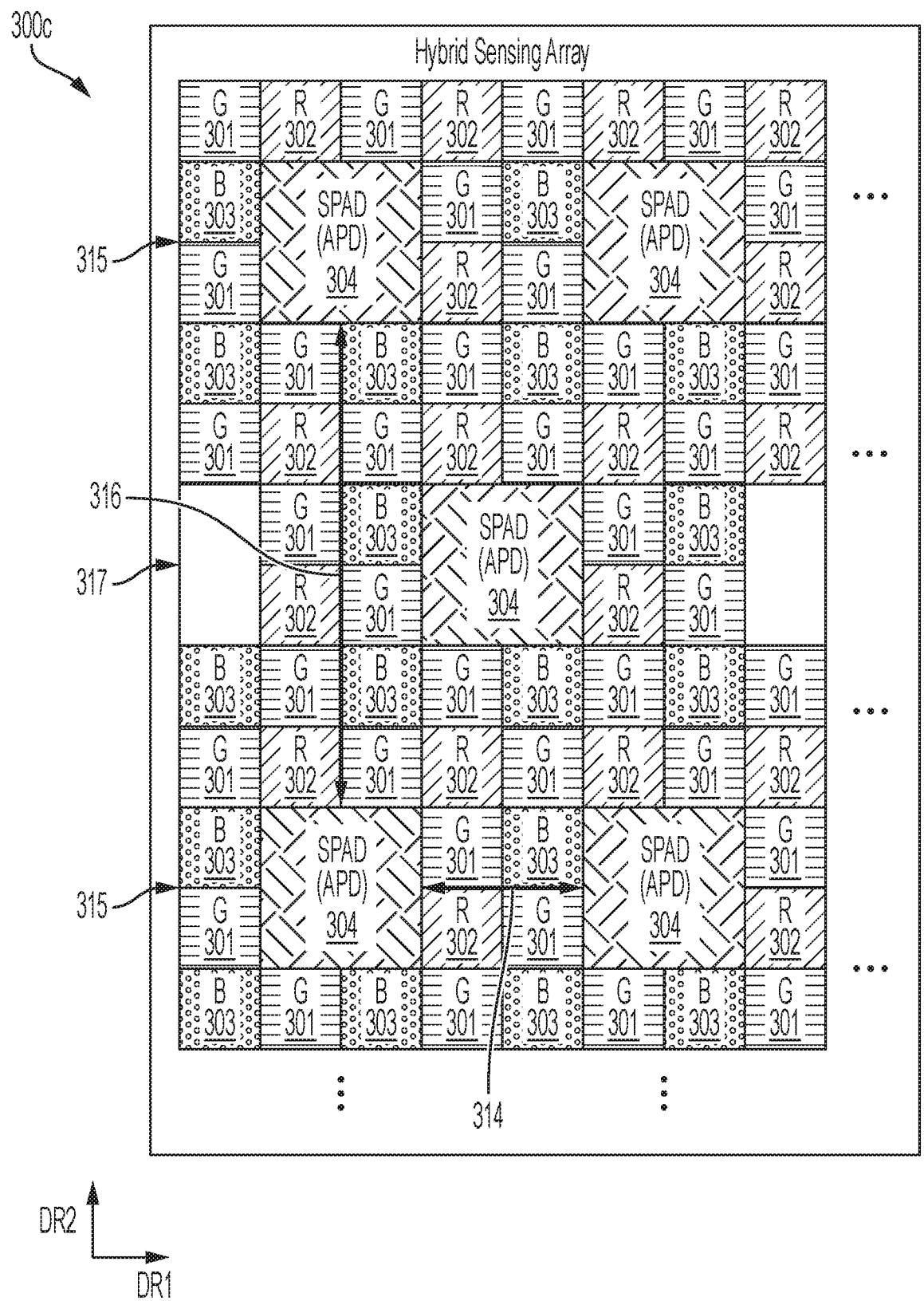

As shown in FIG. 3C, in one or more embodiments, the sensing pixels 304 of odd-numbered sensing pixel rows 315 of the 3D depth sensing region may have a first rectangular-shape arrangement (indicated by the fifth interval 314 being different from the sixth interval 316) and the sensing pixels 304 of even-numbered sensing pixels rows 317 of the 3D depth sensing region may have a second rectangular-shape arrangement (matching the first rectangular-shape arrangement). The first rectangular-shape arrangement may be offset from the second rectangular-shape arrangement in the row direction (e.g., first direction DR1) and/or the column direction (e.g., second direction DR2). In other words, the sensing pixels 304 of the 3D depth sensing region may have a zig-zag-shape arrangement. In the embodiment shown in FIG. 3C, each sensing pixel column of the 2D sensing region may be interrupted (or displaced) by a sensing pixel 304 of the 3D depth sensing region. Further, the ratio of sensing pixels 304 of the 3D depth sensing region to sensing pixels 301, 302, 303 of the 2D sensing region may be 1:12 and each sensing pixel of the 3D depth sensing region may be separated from another sensing pixel of the 3D depth sensing region by two of sensing pixels 301, 302, 303 of the 2D sensing region in the row direction (e.g., first direction DR1) and six of sensing pixels 301, 302, 303 of the 2D sensing region in the column direction (e.g., second direction DR2). However, the present disclosure is not limited thereto. For example, the sensing pixels 304 of the 3D depth sensing region may be separated from each other by any suitable number of sensing pixels 301, 302, 303 of the 2D depth region in the row direction (e.g., the first direction DR1) and/or the column direction (e.g., the second direction DR2) with a corresponding effect on the ratio of sensing pixels 304 of the 3D depth sensing region to sensing pixels 301, 302, 303 of the 2D sensing region.

Figure 3D:
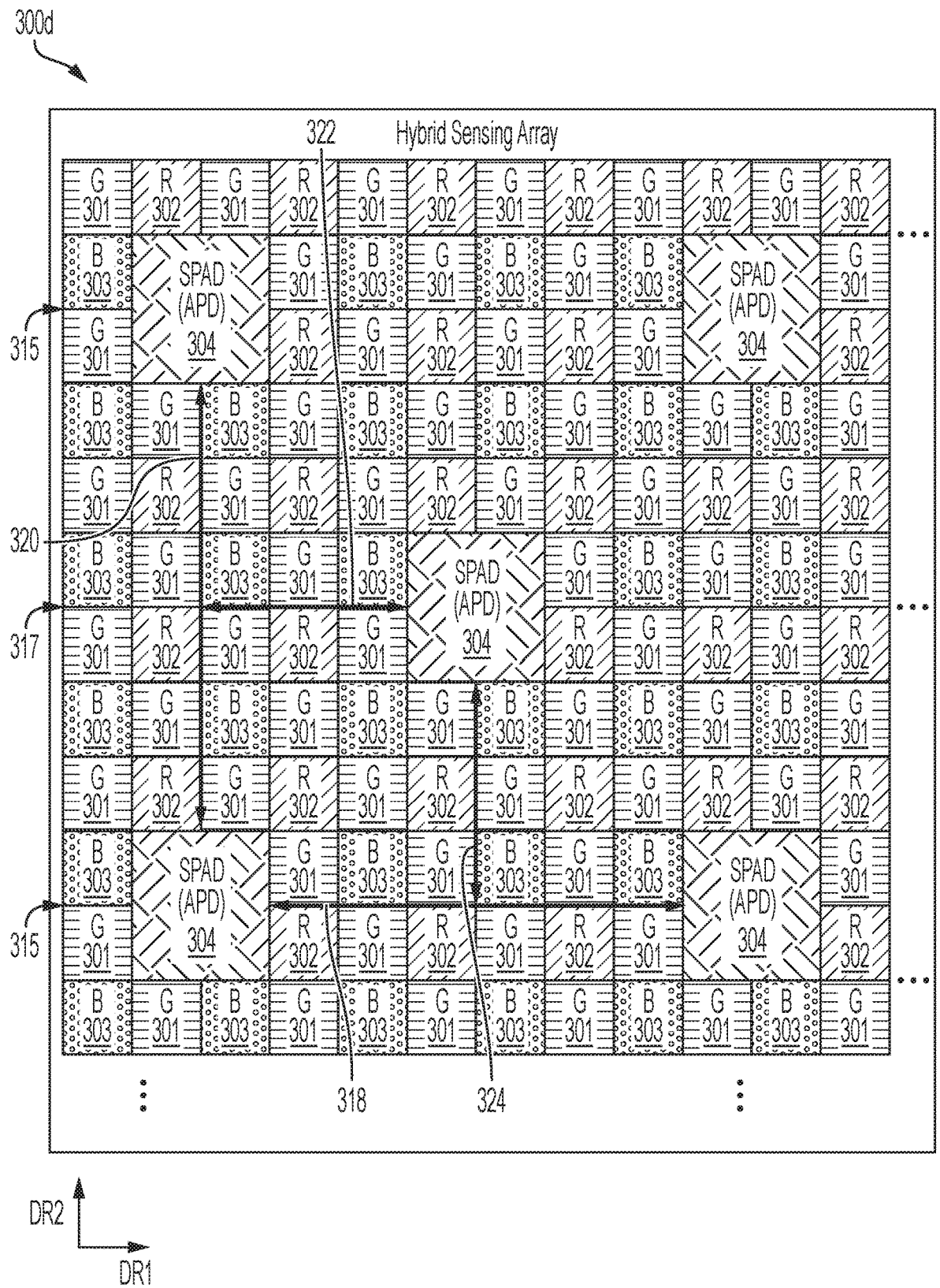

As shown in FIG. 3D, in one or more embodiments, the sensing pixels 304 of odd-numbered sensing pixel rows 315 of the 3D depth sensing region may have a first square-shape arrangement (indicated by the seventh interval 318 being different from the eighth interval 320) and the sensing pixels 304 of even-numbered sensing pixels rows 317 of the 3D depth sensing region may have a second square-shape arrangement (matching the first square-shape arrangement). The first square-shape arrangement may be offset from the second square-shape arrangement in the row direction (e.g., first direction DR1) and/or the column direction (e.g., second direction DR2) at the same interval (i.e., the ninth interval 322 is equal to the tenth interval 324). In other words, the sensing pixels 304 of the 3D depth sensing region may have a diamond-shape arrangement. In the embodiment shown in FIG. 3D, some sensing pixel columns of the 2D sensing region may not be interrupted (or displaced) by a sensing pixel 304 of the 3D depth sensing region. Further, the ratio of sensing pixels 304 of the 3D depth sensing region to sensing pixels 301, 302, 303 of the 2D sensing region may be 1:28 and each sensing pixels 304 of the 3D depth sensing region may be separated from another sensing pixel 304 of the 3D depth sensing region by six of sensing pixels 301, 302, 303 of the 2D sensing region in the row direction (e.g., first direction DR1) and six of sensing pixels 301, 302, 303 of the 2D sensing region in the column direction (e.g., second direction DR2). However, the present disclosure is not limited thereto. For example, the sensing pixels 304 of the 3D depth sensing region may be separated from each other by any suitable number of sensing pixels 301, 302, 303 of the 2D sensing region in the row direction (e.g., the first direction DR1) and/or the column direction (e.g., the second direction DR2) with a corresponding effect on the ratio of sensing pixels 304 of the 3D depth sensing region to sensing pixels 301, 302, 303 of the 2D sensing region.

Referring to FIGS. 3A-3D, each of the various arrangements may affect object detection and tracking by the object detector 212 of the processing circuit 204. For example, the minimum bounding box size for identifying an object (e.g., a human, car, obstacle, and the like) in a 2D image and a 3D image may be affected by placement and ratio of sensing pixels 304 of the 3D depth sensing region to sensing pixels 301, 302, 303 of the 2D sensing region. FIG. 3A may have a minimum bounding box size of 30×8, FIG. 3B may have a minimum bounding box size of 30×8, FIG. 3C may have a minimum bounding box size of 30×6, and FIG. 3D may have a minimum bounding box size of 30×8.

Referring to FIGS. 3E-3H, the sensing pixel rows 326, 328, 330, 332, 334, 336 of the hybrid sensing arrays 300e, 300f, 300g, 300h may be either sensing pixel rows 328, 330, 334, 336 of the 2D sensing region or sensing pixel rows 326, 332 of the 3D depth sensing region. In other words, the 2D sensing region and the 3D depth sensing region may be arranged as alternating horizontal bars in a striped arrangement. However, the present disclosure is not limited thereto. For example, the sensing pixel rows 328, 330, 334, 336 of the 2D sensing region and the sensing pixel rows 326, 332 of the 3D depth sensing region may be arranged as alternating vertical bars in the striped arrangement according to an application thereof. For example, in autonomous driving applications, objects located in front of the vehicle may be more important than objects located at a side of the vehicle. Thus, in this case, the sensing pixel rows 326, 332 of the 3D depth sensing region may be arranged as alternating horizontal bars in the striped arrangement.

Figure 3E:
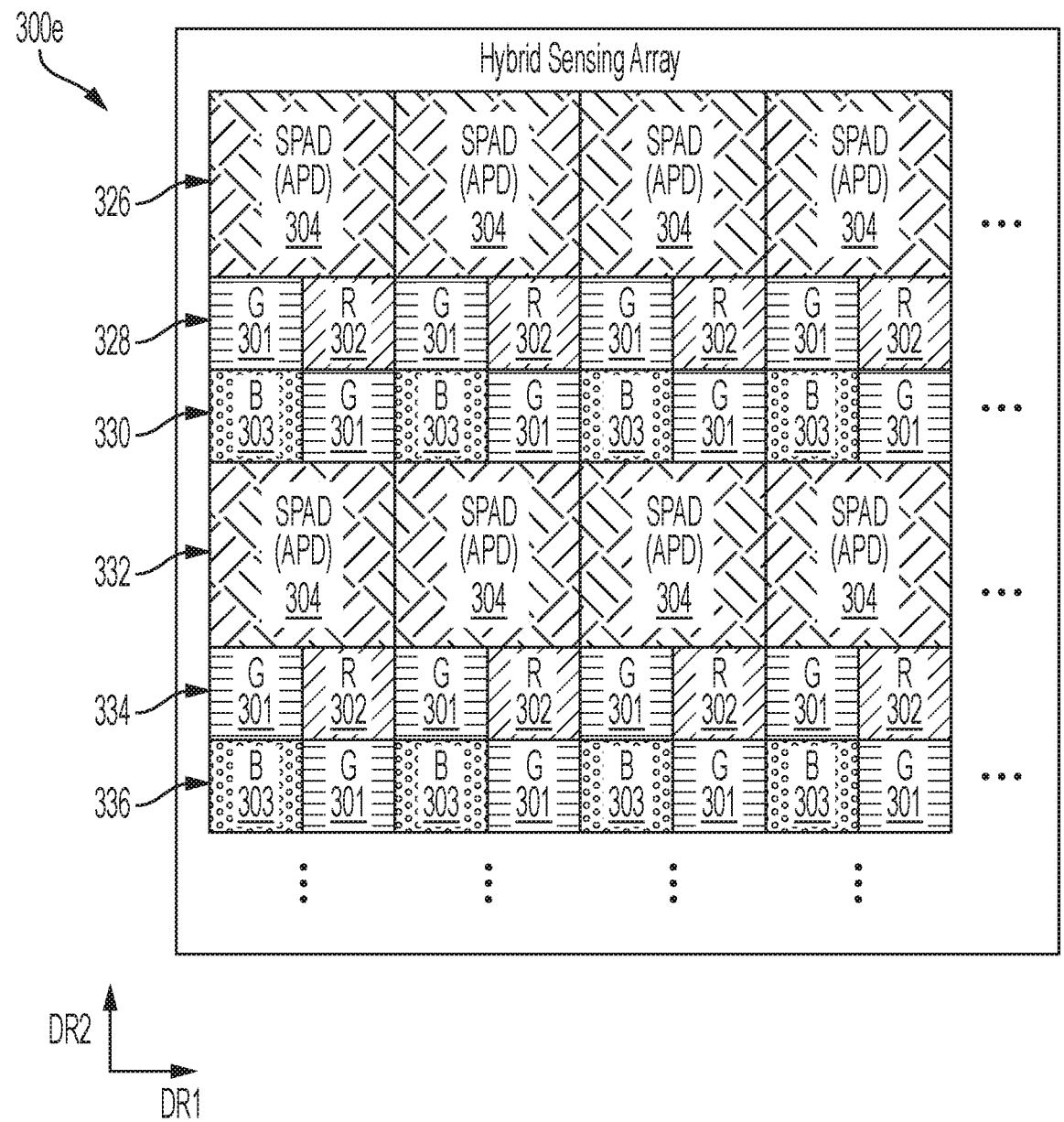
Figure 3F:
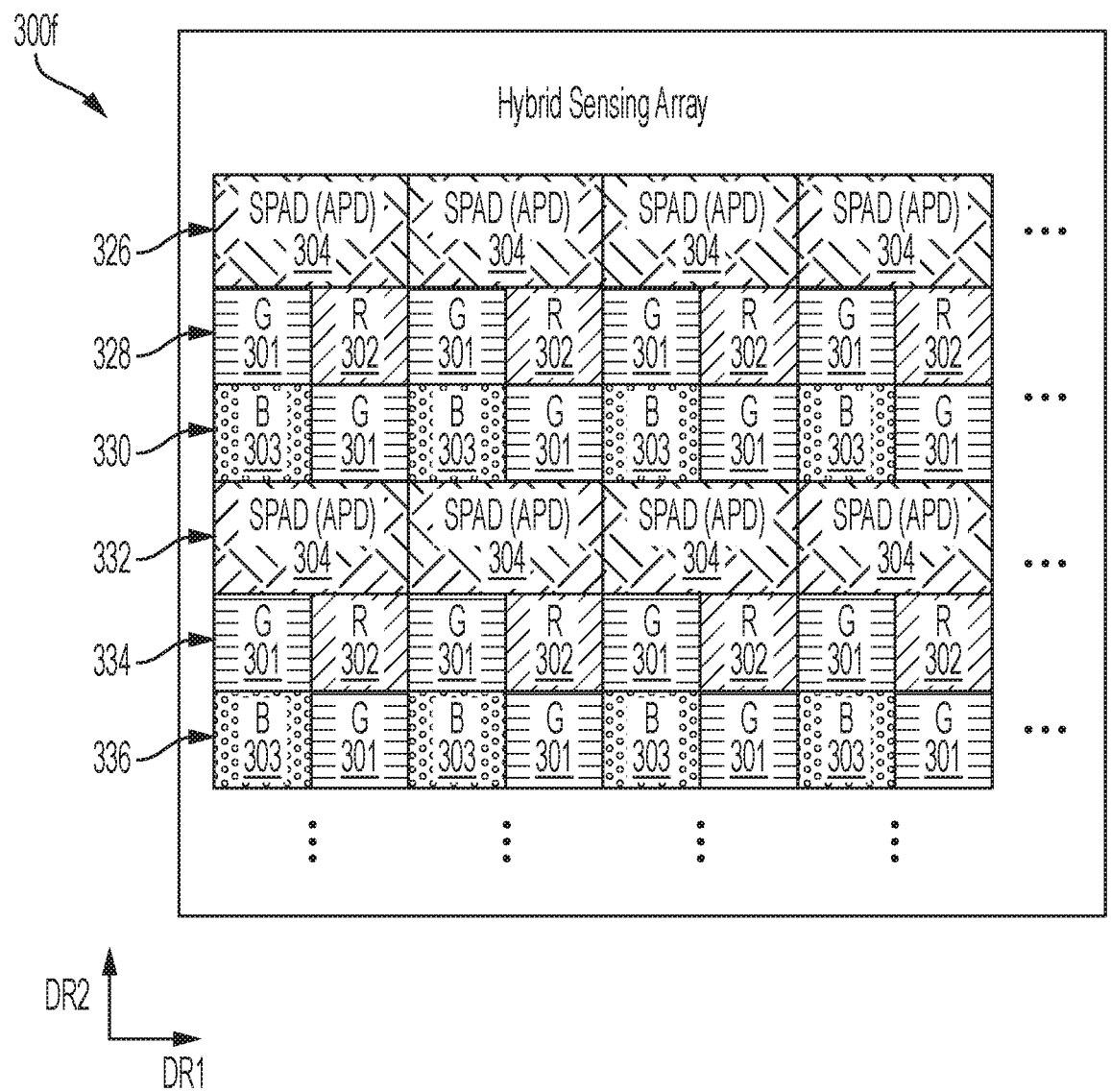
Figure 3G:
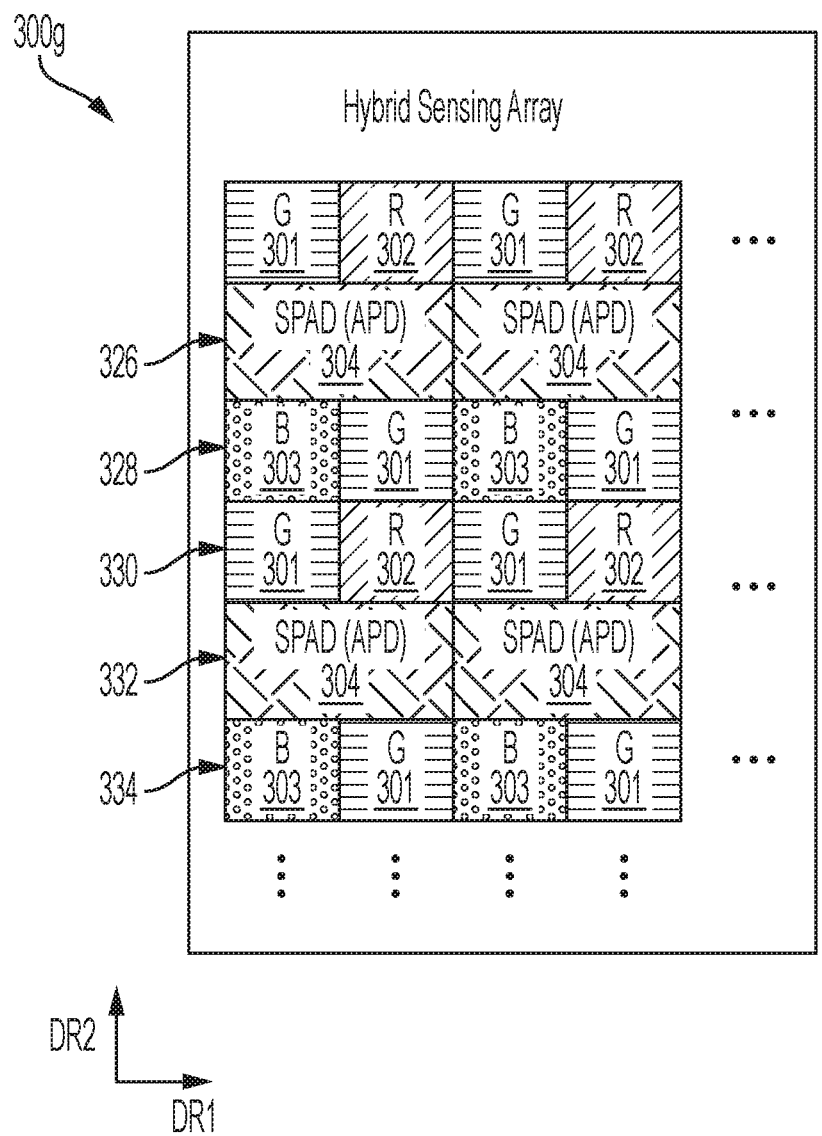
Figure 3H:
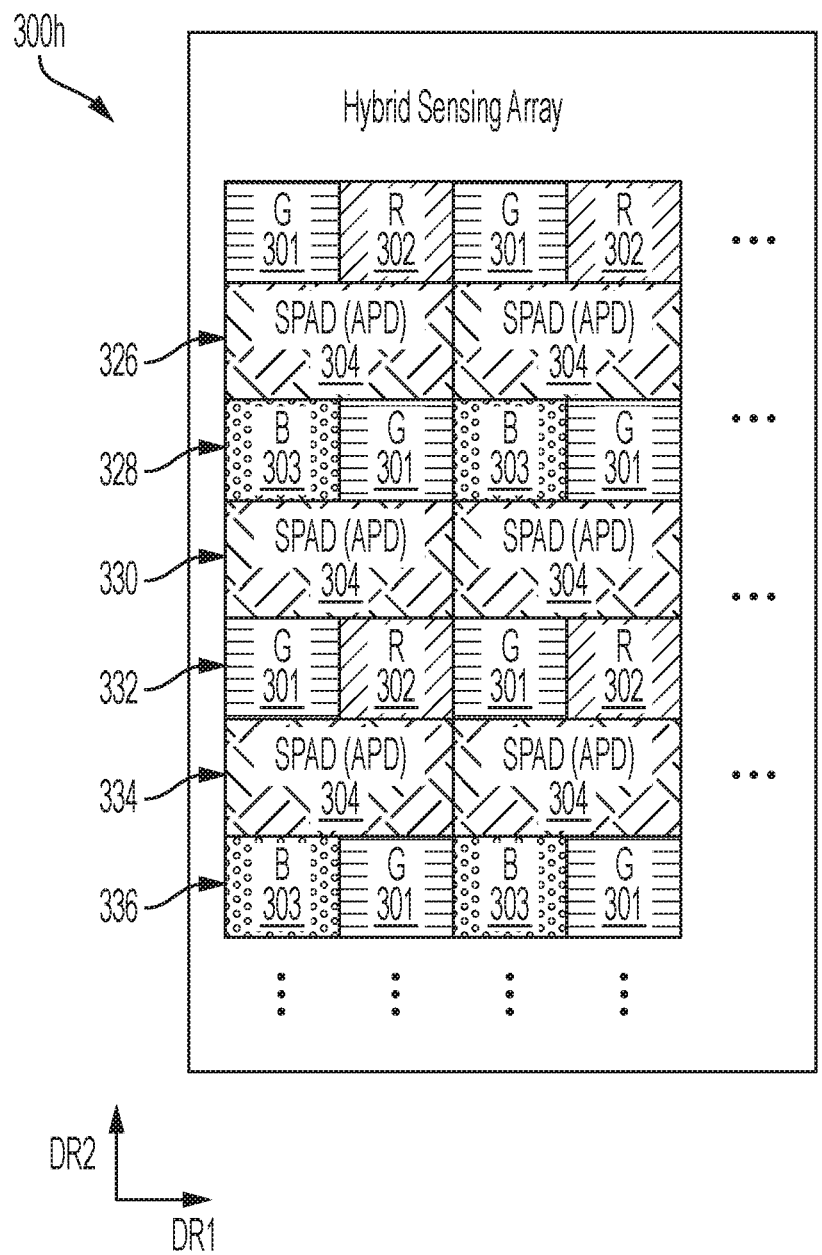
Figure 31:
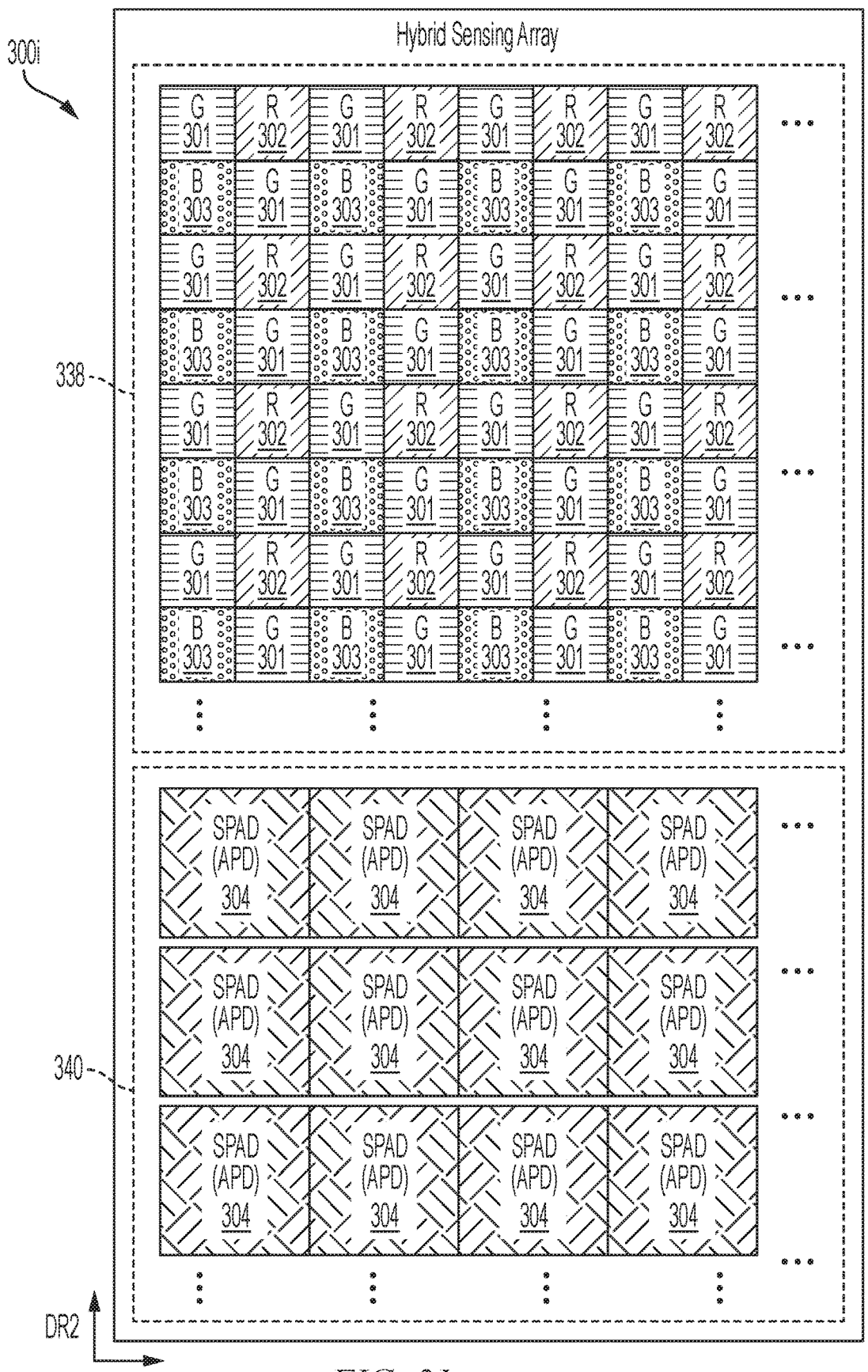

As shown in FIG. 3E, in one or more embodiments, the sensing pixels 304 of the 3D depth sensing region may be repeated consecutively in a row direction (e.g., a first direction DR1) and the sensing pixel 301, 302, 303 of the 2D sensing region may also repeated consecutively in a row direction (e.g., a first direction DR1). In the illustrated embodiment, the sensing pixels 304 of the 3D depth sensing region have a square-shape. However, the present disclosure is not limited thereto. For example, the sensing pixels 304 of the 3D depth sensing region may have any suitable shape such as a rectangular shape as shown in the embodiments of FIGS. 3F-3H.

Referring to FIG. 3E, in a column direction (e.g., the second direction DR2), a sensing pixel row 326 of the 3D depth sensing region may be separated from another sensing pixel row 332 of the 3D depth sensing region by two sensing pixel rows 328, 330 of the 2D sensing region. However, the present disclosure is not limited thereto. For example, the sensing pixel rows 326, 332 of the 3D depth sensing region may be separated from each other by any number of sensing pixel rows of the 2D sensing region at regular or irregular intervals as shown in FIGS. 3G and 3H.

Referring to FIG. 3I, a hybrid sensing array 300i may include a 2D sensing region 338 and a 3D depth sensing region 340 separate from each other in a side-by-side arrangement.

As shown in FIG. 3I, the 2D sensing region 338 is adjacent to the 3D depth sensing region 340 as a whole. In other words, the sensing pixels 304 of the 3D depth sensing region 340 may be directly adjacent to each other such that no sensing pixels 301, 302, 303 of the 2D sensing region 338 may be between the sensing pixels 304 of the 3D depth sensing region 340 in a first direction DR1 or the second direction DR2, and sensing pixels 301, 302, 303 of the 2D sensing region 338 may be directly adjacent to each other such that no sensing pixels 304 of the 3D depth sensing region 340 may be between the sensing pixels 301, 302, 303 of the 2D sensing region 338 in the first direction DR1 or the second direction DR2. The side-by-side arrangement for the 2D sensing region 338 and the 3D depth sensing region 340 may provide enhanced 2D image resolution due to an increase in the density of sensing pixels 301, 302, 303 of the 2D sensing region compared to an arrangement where the sensing pixel 301, 302, 303 of the 2D sensing region may be interwoven with sensing pixels 304 of the 3D depth sensing region as shown in the embodiments of FIGS. 3A-3H.

FIGS. 4A-4D are plan views of portions of hybrid sensing arrays 400a, 400b, 400c, 400d with a plurality of metalenses (e.g., metalens 406) on the hybrid sensing arrays 400a, 400b, 400c, 400d, according to one or more embodiments of the present disclosure.

Referring to FIGS. 4A-4D, in one or more embodiments, the sensing pixels 404 of odd-numbered sensing pixel rows 408, 412 of the 3D depth sensing region may have a first rectangular-shape arrangement (indicated by the eleventh interval 414 and twelfth interval 416 being different from each other) and the sensing pixels 404 of even-numbered sensing pixels rows 410 of the 3D depth sensing region may have a second rectangular-shape arrangement. The first rectangular-shape arrangement may be offset from the second rectangular-shape arrangement in the row direction (e.g., first direction DR1) and/or the column direction (e.g., second direction DR2) at different intervals (e.g., thirteenth interval 418 being different from the fourteenth interval 420). In other words, the sensing pixels of the 3D depth sensing region may have a zig-zag-shape arrangement. However, the present disclosure is not limited thereto, and any suitable shape arrangement may be used. For example, in one or more embodiments, a diamond, square, or rectangular shape arrangement may be used.

Figure 4A:
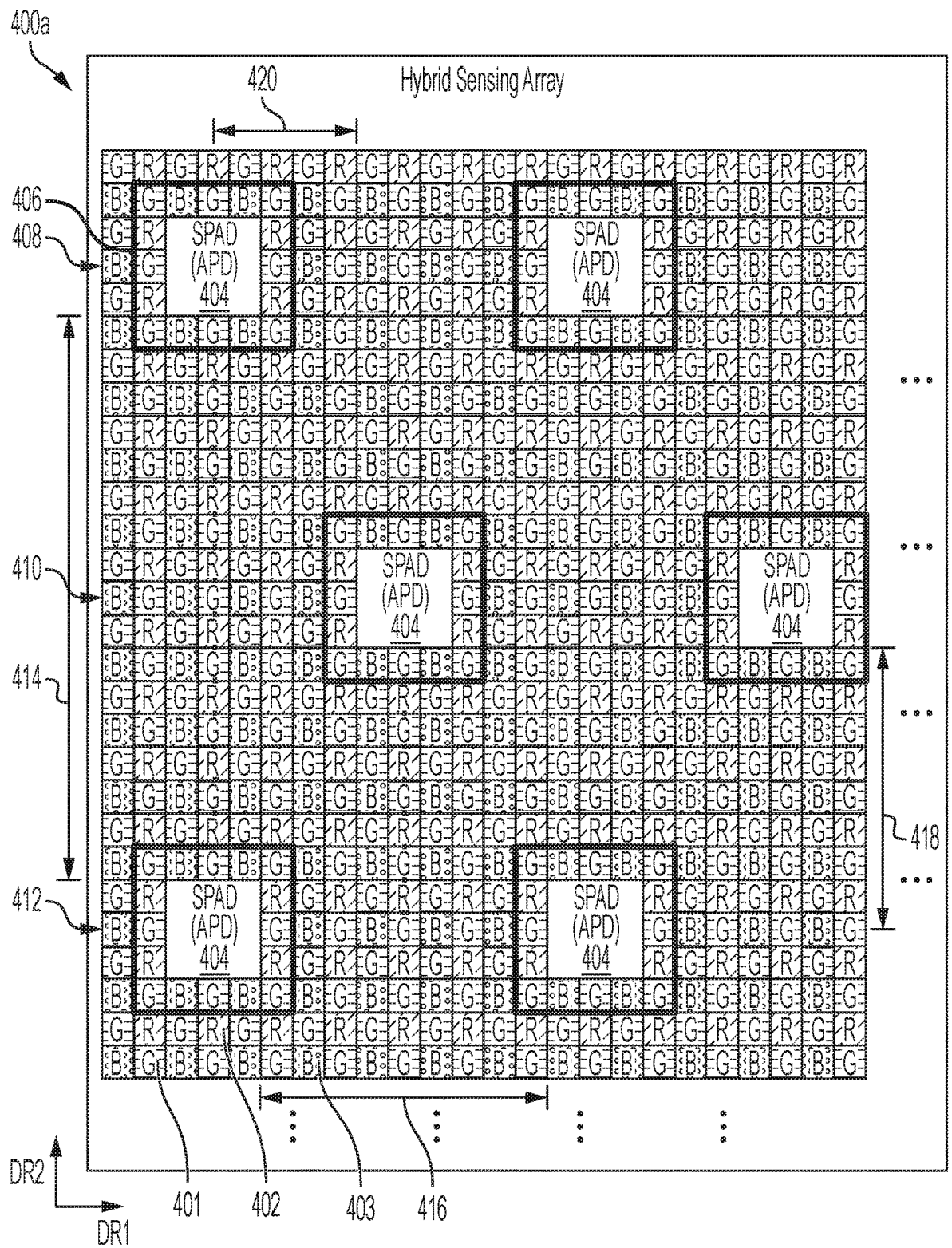
FIGS. 4A-4D are plan views of portions of hybrid sensing arrays with a plurality of metalenses on the hybrid sensing arrays, according to one or more embodiments of the present disclosure.
Figure 4B:
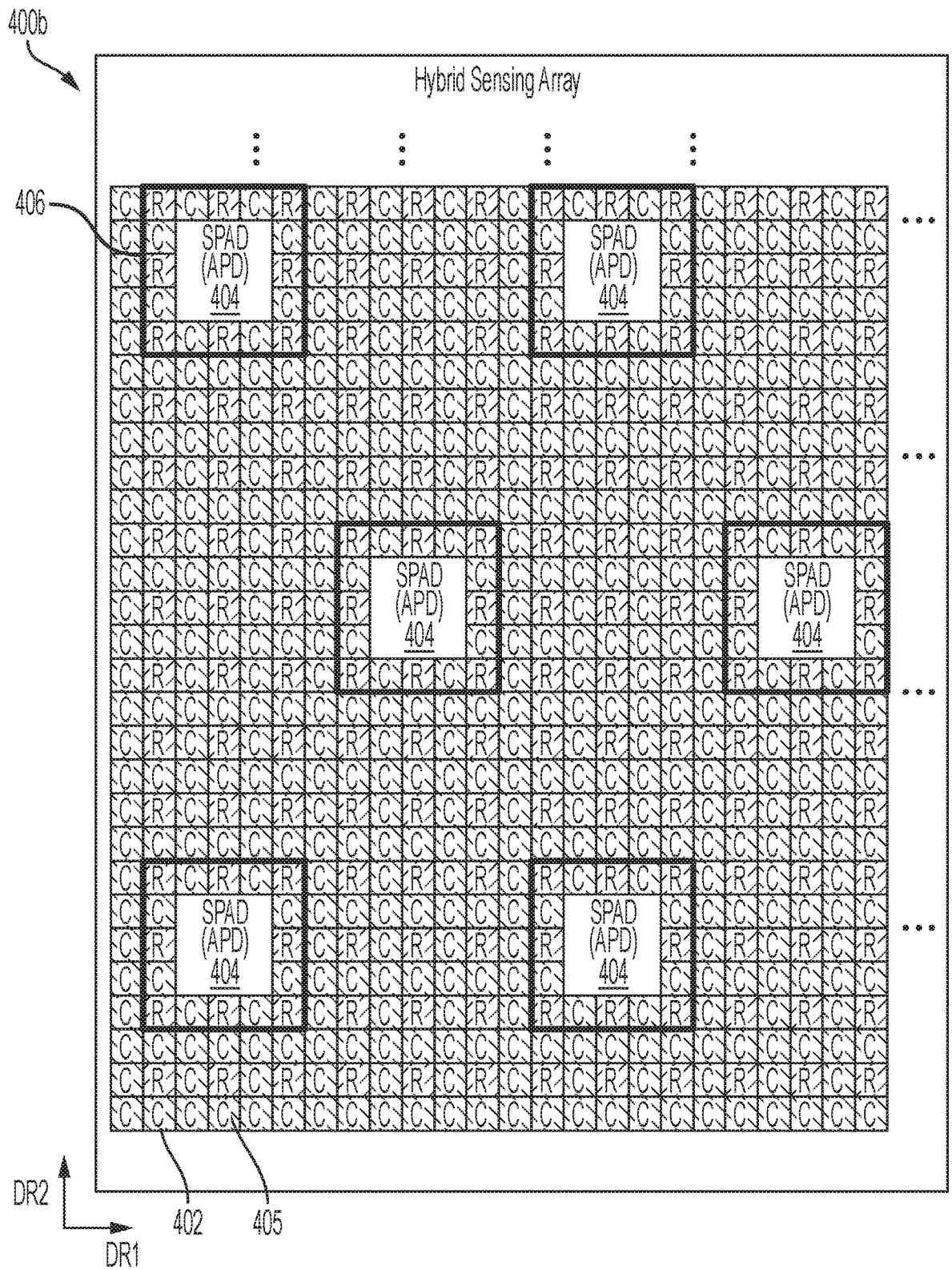

In the embodiments shown in FIG. 4A-4B, some sensing pixel columns of the 2D sensing region may not be interrupted (or displaced) by a sensing pixel 404 of the 3D depth sensing region. Further, each sensing pixel 404 of the 3D depth sensing region may be separated from another sensing pixel 404 of the 3D depth sensing region by nine sensing pixels 401, 402, 403 or 402, 405 in the row direction (e.g., first direction DR1) and seventeen sensing pixels 401, 402, 403 or 402, 405 in the column direction (e.g., second direction DR2). However, the present disclosure is not limited thereto. For example, the sensing pixels 404 of the 3D depth sensing region may be separated from each other by any suitable number of sensing pixels 401, 402, 403 or 402, 405 of the 2D sensing region in the row direction (e.g., the first direction DR1) and/or the column direction (e.g., the second direction DR2). In the embodiments shown in FIGS. 4C-4D, each sensing pixel 404 of the 3D depth sensing region may be separated from another sensing pixel 404 of the 3D depth sensing region by nine sensing pixels 401, 402, 403 or 402, 405 in the row direction (e.g., first direction DR1) and fifteen sensing pixels 401, 402, 403 or 402, 405 in the column direction (e.g., second direction DR2).

Figure 4C:
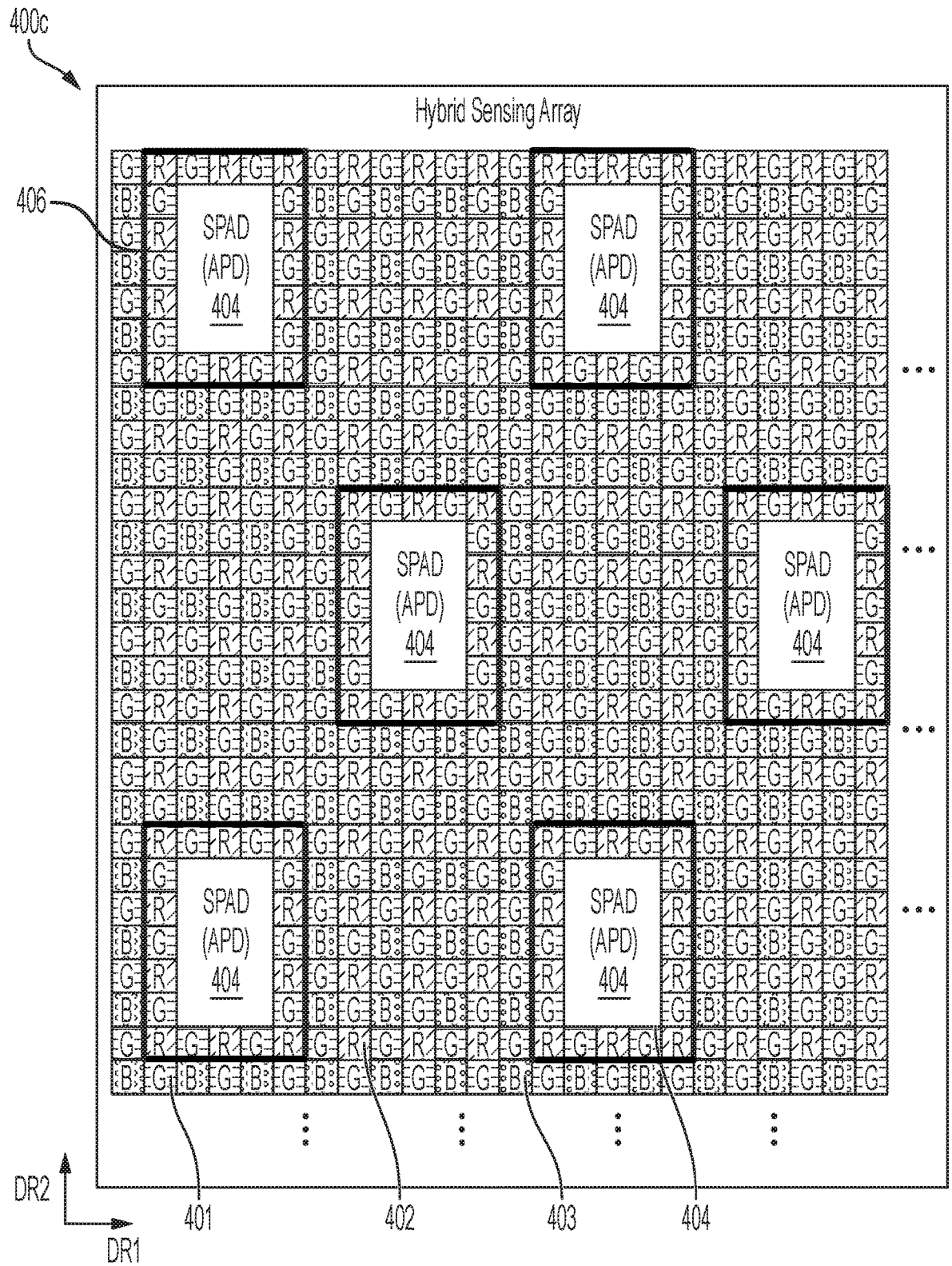
Figure 4D:
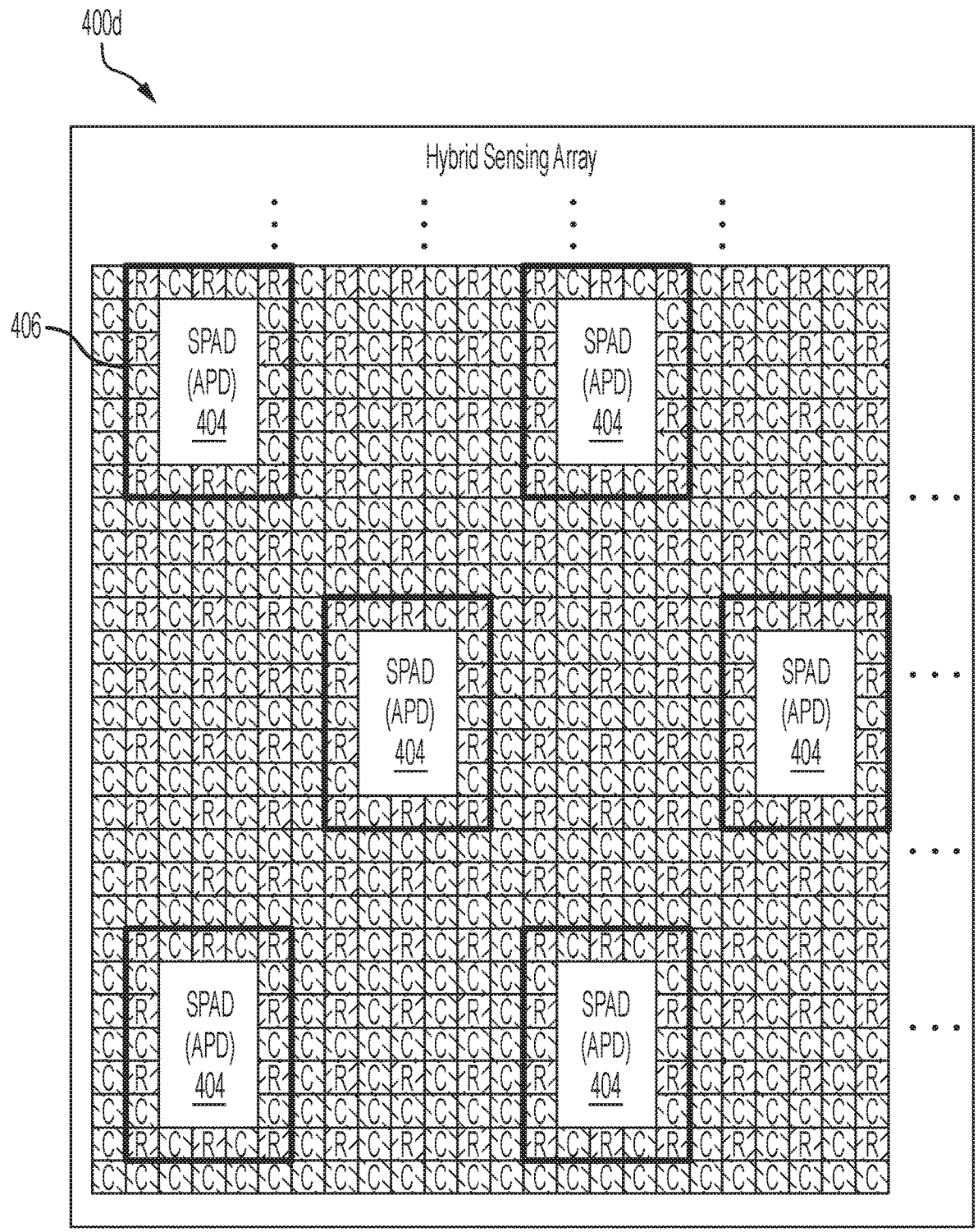

Although the sensing pixels 404 of the 3D depth sensing region shown in FIGS. 4A-4B have an area of a particular size and shape (e.g., a square shape area with an area ratio of one sensing pixel 404 of the 3D depth sensing region to nine sensing pixels 401, 402, 403 or 402, 405 of the 2D sensing region), the sensing pixels 404 of the 3D depth sensing region may be any suitable size or shape. For example, as shown in FIGS. 4C-4D, the sensing pixels 404 of the 3D depth sensing region may have a larger area and that area may be rectangular (e.g., a rectangular shape area with an area ratio of one sensing pixel 404 of the 3D depth sensing region to 15 sensing pixels 401, 402, 403 or 402, 405 of the 2D sensing region). In the case of a sensing pixel 404 of the 3D depth sensing region having a rectangular shape, the sensing pixel 404 of the 3D depth sensing region may be more suitable for detecting narrow objects compared to a sensing pixel 404 of the 3D depth sensing region having a square shape. For example, a square shape may be more suitable for detecting an object which has a square-shape aspect ratio and a rectangular shape may more suitable for detecting a narrow object with a rectangular-shape aspect ratio. Further, a larger area for a sensing pixel 404 of the 3D depth sensing region may be more appropriate for detecting objects at greater distances (e.g., NIR reflected from the object may be more likely to be directed (or focused) onto a portion of the sensing pixel 404 of the 3D depth sensing region). By positioning larger area sensing pixels 404 of the 3D depth sensing region adjacent to each other, a sensing signal provided by each sensing pixel 404 of the 3D depth sensing region may be confirmed by adjacent sensing pixels 404 of the 3D depth sensing region to avoid false-positive 3D depth information due to noise and the like at a single sensing pixel 404 of the 3D depth sensing region. Therefore, depending on the application, it may be desirable to have sensing pixels of the 3D depth sensing region of suitable sizes and shapes.

In one or more embodiments, as shown in FIGS. 4A-4D, a plurality of metalenses (e.g., metalens 406) may cover each sensing pixel 404 of the 3D depth sensing region and one or more sensing pixels 401, 402, 403 or 402, 405 of the 2D sensing region that may be adjacent to the sensing pixel 404 of the 3D depth sensing region. In this case, light incident on the metalens 406 may be directed according to wavelength to either the sensing pixels 401, 402, 403 or 402, 405 of the 2D sensing region or the sensing pixels 404 of the 3D depth sensing region. For example, visible light incident on the metalens 406 may be directed (or focused) on the sensing pixels 401, 402, 403 or 402, 405 of the 2D sensing region, and NIR light incident on the metalens 406 may be directed (or focused) on the sensing pixels 404 of the 3D depth sensing region adjacent (e.g., directly adjacent) to the sensing pixels 401, 402, 403 or 402, 405 of the 2D depth sensing region.

In one or more embodiments, the metalens 406 directs (or focuses) light based on nanostructures which may be suitably modified to direct (or focus) set wavelength spectrums of incident light toward respective sensing regions of the hybrid sensing array as will be described in more detail with reference to FIGS. 5A-6B below. In this case, a center portion of the metalens 406 may be designed to direct (or focus) different wavelengths of light from an outer portion of the metalens 406 surrounding the center portion of the metalens 406.

Although in the illustrated embodiment a plurality of metalens 406 each cover a single sensing pixel 404 of the 3D depth sensing region and sensing pixels 401, 402, 403 or 402, 405 of the 2D depth sensing region adjacent to the sensing pixel 404 of the 3D depth sensing region, the present disclosure is not limited thereto. For example, the metalens 406 may cover only sensing pixels 401, 402, 403 or 402, 405 of the 2D sensing region and not the sensing pixel 404 of the 3D depth sensing region such that the metalens 406 directs (or focuses) visible light toward the sensing pixels 401, 402, 403 or 402, 405 of the 2D sensing region and NIR light toward the sensing pixel 404 of the 3D depth sensing region, and, in other embodiments, the metalens 406 may cover only sensing pixels 404 of the 3D depth sensing region and not the sensing pixels 401, 402, 403 or 402, 405 of the 2D sensing region such that the metalens 406 directs (or focuses) visible light toward the sensing pixels of the 2D sensing region and NIR light toward the SPADs. Accordingly, the metalens 406 may be any shape and cover any number or type of sensing pixels of the hybrid sensing array with suitable adjustments to the metalens 406.

Although FIGS. 4A-4D illustrate a plurality of metalenses, the present disclosure is not limited thereto. For example, any number of metalenses 406 may be used to cover the hybrid sensing array, for example, a global lens (i.e., a single metalens) having nanostructures thereon may be used to cover the entire hybrid sensing array with suitable changes to the nanostructures of the global lens. Although the embodiment of FIGS. 4A and 4C include red, green, and blue sensing pixels, the present disclosure is not limited thereto. For example, as shown in FIGS. 4B and 4D, the sensing pixels may include red and clear sensing pixels instead of red, green, and blue sensing pixels.

Figure 5A:
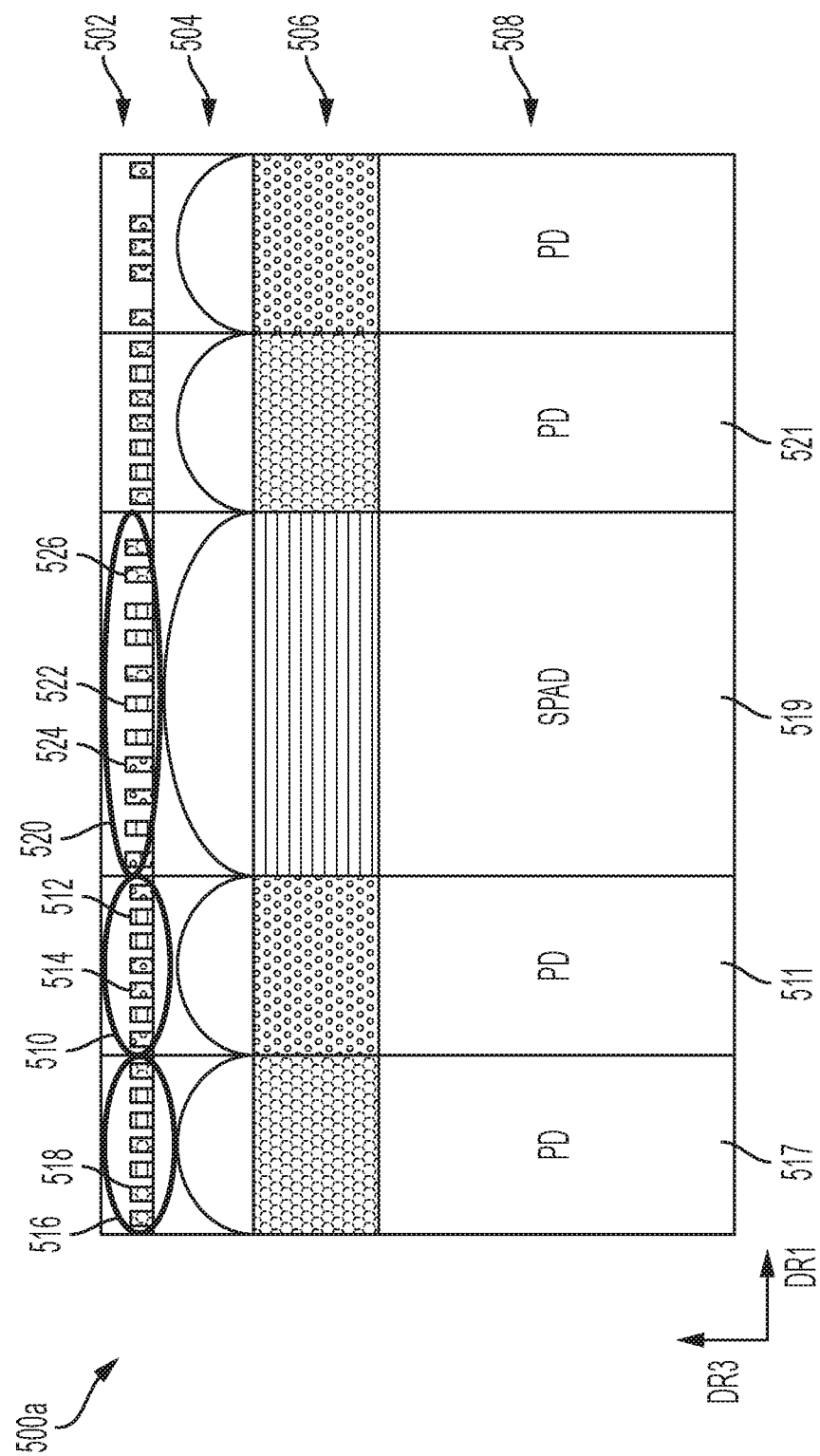
FIGS. 5A-5C are cross-sectional views of a hybrid sensing array with a metalens and a microlens on the hybrid sensing array, according to one or more embodiments of the present disclosure.
Figure 5B:
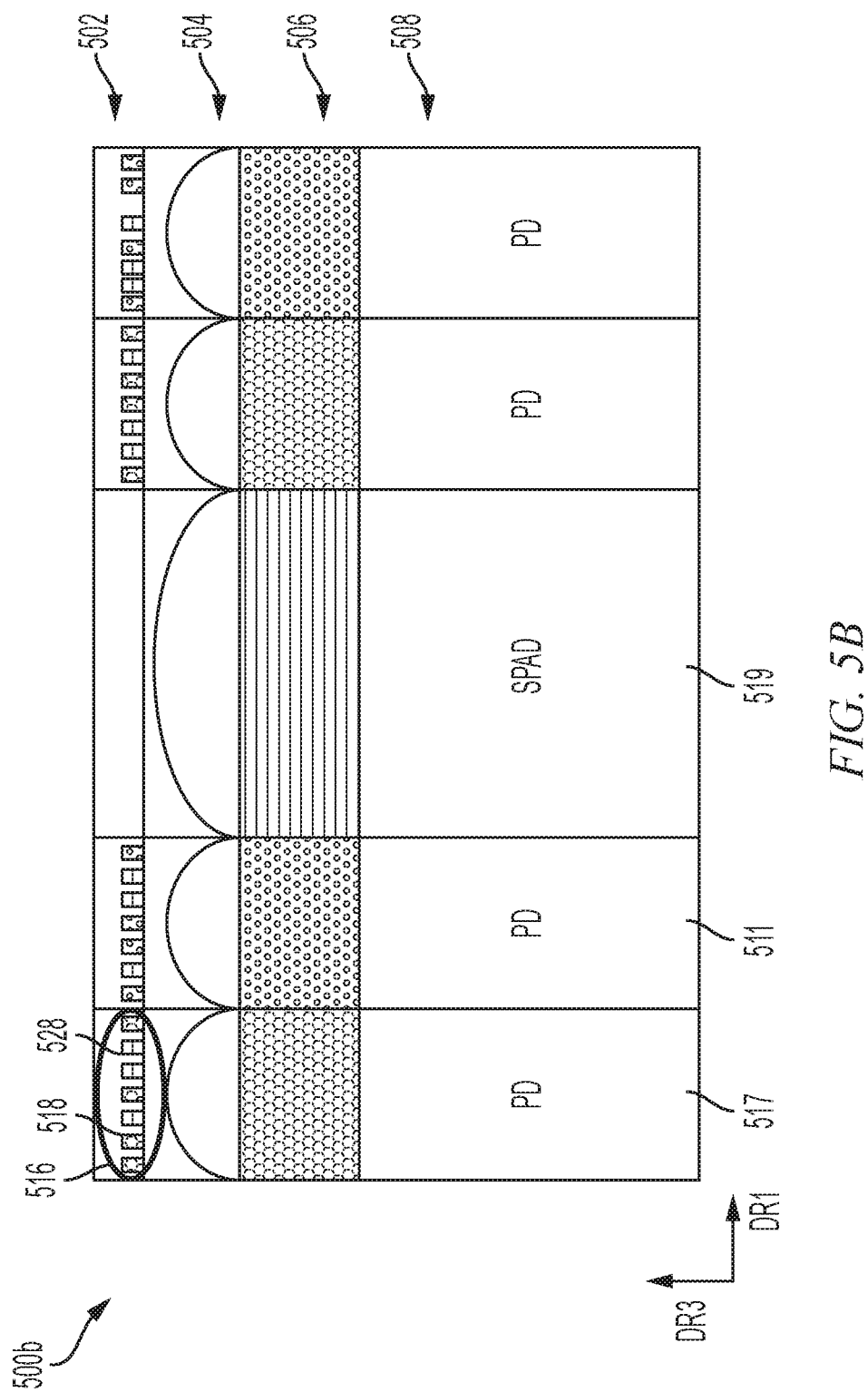
Figure 5C:
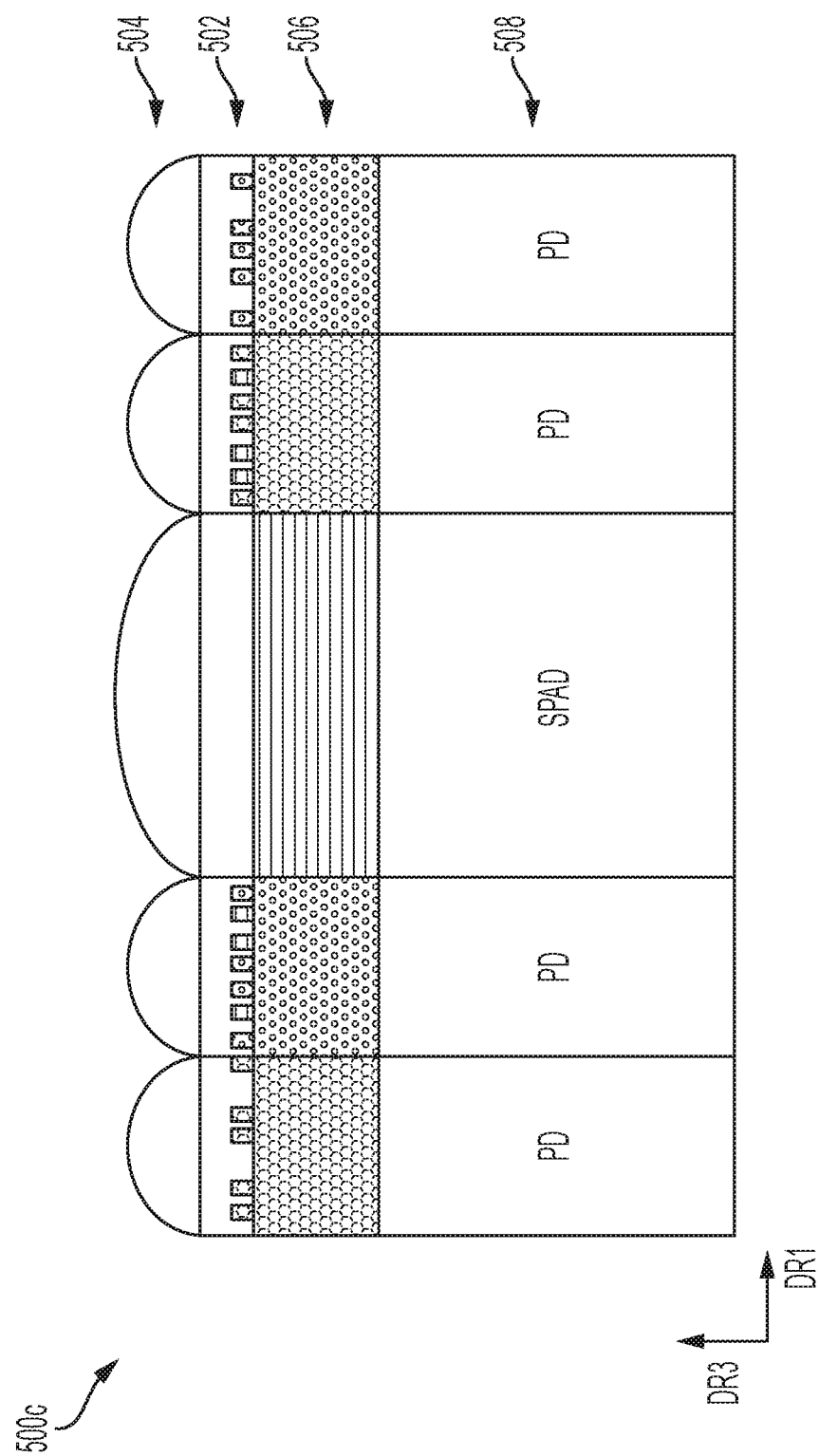

FIGS. 5A-5C are a cross-sectional views 500a, 500b, 500c of a hybrid sensing array with a metalens 502 and a microlens 504 on the hybrid sensing array, according to one or more embodiments of the present disclosure.

Referring to FIGS. 5A-5C, according to one or more example embodiments of the present disclosure, a microlens 504 and a metalens 502 may be on a hybrid sensing array 508. The metalens 502 may include a plurality of nanostructures 512, 514, 518, 522, 524, 526 (e.g., a plurality of thin dielectric nano-antenna blocks or scatterrers) disposed on rigid or a flexible transparent substrate suitable for transmitting one or more target wavelength spectrums of external light therethrough. The metalens 502 (e.g., the flexible transparent substrate of the metalens 502) may be any suitable shape such as, for example, a circular, cylindrical, rectangular, or square shape. In one or more embodiments, the metalens 502 may have polarization-independent properties.

The shape, size, and position of each of the nanostructures 512, 514, 518, 522, 524, 526 may affect properties of light such as phase, polarization, and focal point. Therefore, each of the nanostructures 512, 514, 518, 522, 524, 526 may be disposed on the substrate to have different geometric structures and/or arrangements to direct (or focus) different target wavelength spectrums of external light towards different portions of the hybrid sensing array 508. In one or more embodiments, the nanostructures 512, 514, 518, 522, 524, 526 may be circular, cylindrical, rectangular, square, etc., in shape, and the nanostructures 512, 514, 518, 522, 524, 526 may be arranged such that the one or more metalenses (e.g., metalens 502) exhibit polarization-independent properties.

In one or more embodiments, as shown in FIG. 5A, the metalens 502 includes a first group 510 of nanostructures (e.g., a first nanostructure 512 and a second nanostructure 514) overlapping (e.g., overlapping in the third direction DR3) a first sensing pixel 511 of the 2D sensing region and a second group 516 of nanostructures (e.g., a third nanostructure 518) overlapping (e.g., overlapping in the third direction DR3) a second sensing pixel 517 of the 2D sensing region, and a third group 520 of nanostructures (e.g., a fourth nanostructure 522, a fifth nanostructure 524, and a sixth nanostructure 526) overlapping (e.g., overlapping in the third direction DR3) a sensing pixel 519 of the 3D depth sensing region.

In one or more embodiments, the first group 510 of nanostructures (e.g., the first nanostructure 512 and the second nanostructure 514) may be configured to direct (or focus) different wavelength spectrums of external light to different portions of the hybrid sensing array 508. For example, the first nanostructure 512 overlapping the first sensing pixel 511 may be configured to direct (or focus) light in the NIR spectrum (e.g., greater than 0.8 micrometers) toward the sensing pixel 519 of the 3D depth sensing region directly adjacent to the first sensing pixel 511 of the 2D sensing region, and the second nanostructure 514 overlapping the first sensing pixel 511 of the 2D sensing region may be configured to direct (or focus) light in the visible to NIR spectrum (e.g., about 0.4 micrometers to about 0.8 micrometers) toward the first sensing pixel 511 of the 2D sensing region. Accordingly, the first group 510 of nanostructures may function as a beam splitter by directing (or focusing) different wavelength spectrums towards different sensing regions of the hybrid sensing array.

In one or more embodiments, each of the nanostructures (e.g., the third nanostructure 518) of the second group 516 may be configured to direct (or focus) the same wavelength spectrum of external light to the same portion of the hybrid sensing array 508. For example, each of the nanostructures (e.g., the third nanostructure 518) of the second group 516 may be configured to direct (or focus) light in the visible to NIR spectrum (e.g., about 0.4 micrometers to about 0.8 micrometers) toward the second sensing pixel 517 of the 2D sensing region. In other words, none of the nanostructures in the second group 516 overlapping (e.g., overlapping in the third direction DR3) the second sensing pixel 517 of the 2D sensing region direct (or focus) light toward adjacent sensing pixels. However, the present disclosure is not limited thereto. For example, the second group 516 may have nanostructures directing (or focusing) light toward adjacent and/or directly adjacent sensing pixels to function as a beam splitter.

In one or more embodiments, the third group 520 of nanostructures (e.g., the fourth nanostructure 522, the fifth nanostructure 524, and the sixth nanostructure 526) may be configured to direct (or focus) different wavelength spectrums of external light to different portions of the hybrid sensing array 508. For example, the fourth nanostructure 522 overlapping the sensing pixel 519 of the 3D depth sensing region may be configured to direct (or focus) light in the NIR spectrum (e.g., greater than 0.8 micrometers) toward the sensing pixel 519 of the 3D depth sensing region, the fifth nanostructure 524 overlapping the sensing pixel 519 of the 3D depth may be configured to direct (or focus) light in the visible to NIR spectrum (e.g., about 0.4 micrometers to about 0.8 micrometers) toward the first sensing pixel 511 of the 2D sensing region directly adjacent to the sensing pixel 519 of the 3D depth sensing region, and the sixth nanostructure 526 overlapping the sensing pixel 519 of the 3D depth may be configured to direct (or focus) light in the visible to NIR spectrum (e.g., about 0.4 micrometers to about 0.8 micrometers) toward the third sensing pixel 521 of the 2D sensing region directly adjacent to the sensing pixel 519 of the 3D depth sensing region. Accordingly, the third group 520 of nanostructures may function as a beam splitter by directing (or focusing) different wavelength spectrums towards different sensing regions of the hybrid sensing array. In this case, the third group 520 may direct (or focus) light towards three different sensing pixels. However, the present disclosure is not limited thereto, and any suitable directing (or focusing) arrangement of nanostructures may be used.

Although the metalens is shown and described in FIG. 5A as including nanostructures overlapping each of the sensing pixels, the present disclosure is not limited thereto. For example, as shown in FIG. 5B, some sensing pixels (e.g., the sensing pixel 519 of the 3D depth sensing region in the embodiment of FIG. 5B) may not have nanostructures overlapping the sensing pixel 519 of the 3D depth sensing region in the third direction.

Although the metalens is shown and described in FIG. 5A as including nanostructures overlapping sensing pixels where beam splitting involves directly adjacent sensing pixels, the present disclosure is not limited thereto. For example, as shown in FIG. 5B, the second group 516 may include a seventh nanostructure 528 in addition to the third nanostructure 518 shown in the embodiment FIG. 5A. As shown in FIG. 5B, the third nanostructure 518 of the second group 516 may be configured to direct (or focus) light in the visible to NIR spectrum (e.g., about 0.4 micrometers to about 0.8 micrometers) toward the second sensing pixel 517 of the 2D sensing region, and the seventh nanostructure 528 of the second group 516 may be configured to direct (or focus) light in the NIR spectrum (e.g., greater than 0.8 micrometers) toward the sensing pixel 519 of the 3D depth sensing region adjacent to the second sensing pixel 517 of the 2D sensing region with intervening first sensing pixel 511 of the 2D sensing region between the second sensing pixel 517 of the 2D sensing region and the sensing pixel 519 of the 3D depth sensing region.

In one or more embodiments, one or more microlenses (e.g., microlens 504) may help focus incident light toward target portions of the sensing pixels. The microlens 504 may be position below the metalens 502 as shown in the embodiments of FIGS. 5A and 5B, and in other embodiments, the microlens 504 may be positioned above the metalens 502 as shown in FIG. 5C. In other words, the microlens 504 may be between the metalens 502 and the hybrid sensing array in the embodiments of FIGS. 5A and 5B, and in other embodiments, the metalens 502 may be between the microlens 504 and the hybrid sensing array as shown in the embodiment of FIG. 5C.

In one or more embodiments, a plurality of color filters 506 may filter set wavelength spectrums of light. Each of the color filters 506 in the embodiments of FIGS. 5A-5C correspond to the wavelength of light sensed by the sensing pixel overlapping the color filters 506 in the thickness direction (e.g., the third direction DR3). For example, a blue light may transmit through a blue color filter of the plurality of color filters 506 overlapping a blue sensing pixel (e.g., the first sensing pixel 511) and a NIR light may transmit through a NIR color filter of the plurality of color filters 506 overlapping the sensing pixel 519.

Accordingly, as shown in FIGS. 5A-5C, external light incident on the metalens 502 including one or more nanostructures (e.g., structures for scattering lobes of different wavelength light) may be directed (or focused) based on one or more target wavelength spectrums toward the 2D sensing region and/or the 3D depth sensing region of the hybrid sensing array 508.

Although a microlens 504 is shown in FIGS. 5A-5C, the microlens 504 provides dedicated light focusing capabilities to supplement the capability of the metalens 502 to focus and redirect target wavelength spectrums. Therefore, in one or more embodiments, a microlens 504 may not be present where additional light focusing may not necessary. However, in the embodiments of FIGS. 5A-5C, the microlens 504 may be present to help resolve issues with the chief ray angle ("CRA") or FOV of the 2D sensing region and the 3D depth sensing region.

Figure 6A:
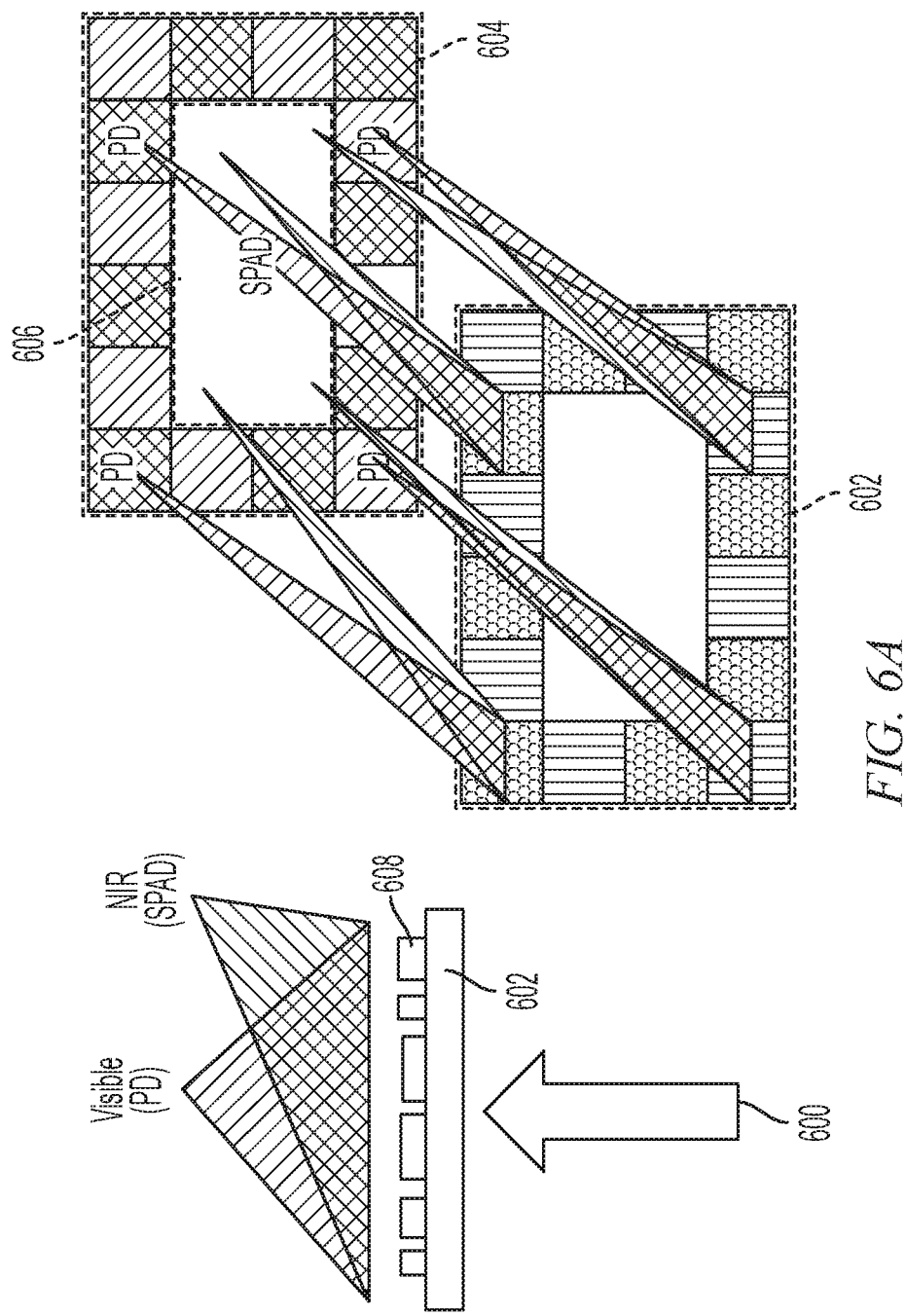
FIG. 6A is a block diagram including a metalens and an exploded view of a metalens on a hybrid sensing array, according to one or more embodiments of the present disclosure.

FIG. 6A is a block diagram including a portion of a global metalens 602 and an exploded view of the portion of the global metalens 602 on a hybrid sensing array, according to one or more embodiments of the present disclosure.

In one or more embodiments, external light 600 including NIR light and visible light may be incident on the global metalens 602. The global metalens may include one or more nanostructures 608 directing (or focusing) different wavelength spectrums of the external light 600 such that external light 600 is split into visible light and NIR light. In one or more embodiments, visible light may be directed (or focused) towards the sensing pixels of the 2D sensing region 604 including PDs and NIR light may be directed (or focused) towards the sensing pixels of the 3D depth sensing region 606 including one or more SPADs.

Accordingly the global metalens 602 may cover an entire hybrid sensing array and different portions of the global metalens 602 may direct (or focus) visible light to portions of the 2D sensing region proximate to the portion of the global metalens 602 and the different portions of the global metalens 602 may direct (or focus) NIR light to portions of the 3D depth sensing region proximate to the portion of the global metalens 602.

Figure 6B:
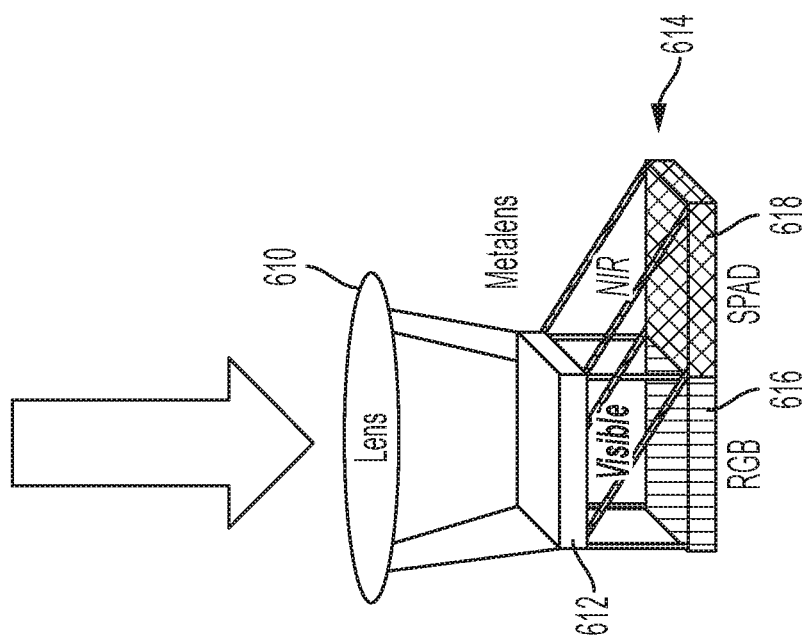
FIG. 6B is an exploded block diagram including a lens and a metalens on a hybrid sensing array, according to one or more embodiments of the present disclosure.

FIG. 6B is an exploded block diagram including a lens (e.g., a global lens) 610 and a global metalens 612 on a hybrid sensing array 614, according to one or more embodiments of the present disclosure.

Referring to FIG. 6B, in one or more embodiments, a hybrid sensing array 614 may include a 2D sensing region 616 and a 3D depth sensing region 618 adjacent to each other in a side-by-side arrangement with the 2D sensing region 616 and the 3D depth sensing region 618 sharing the same FOV because of one main lens. In one or more embodiments, the global metalens 612 may be centered to cover the 2D sensing region 616 such that visible light directed (or focused) by the global metalens 612 onto the red, green, and blue sensing pixels of the 2D sensing region results in high 2D image quality. Further, the global metalens 612 directs (or focuses) sufficient NIR light towards the 3D depth sensing region 618 to provide 3D depth information. Accordingly, centering the global metalens 612 to cover the 2D sensing region 616 assists in providing a high-resolution 2D image while redirected (or focused) NIR light to the adjacent 3D depth sensing region 618 provides sufficient NIR light for the sensing pixels of the 3D depth sensing region 618 to detect the NIR light and provide 3D depth information.

Figure 7A:
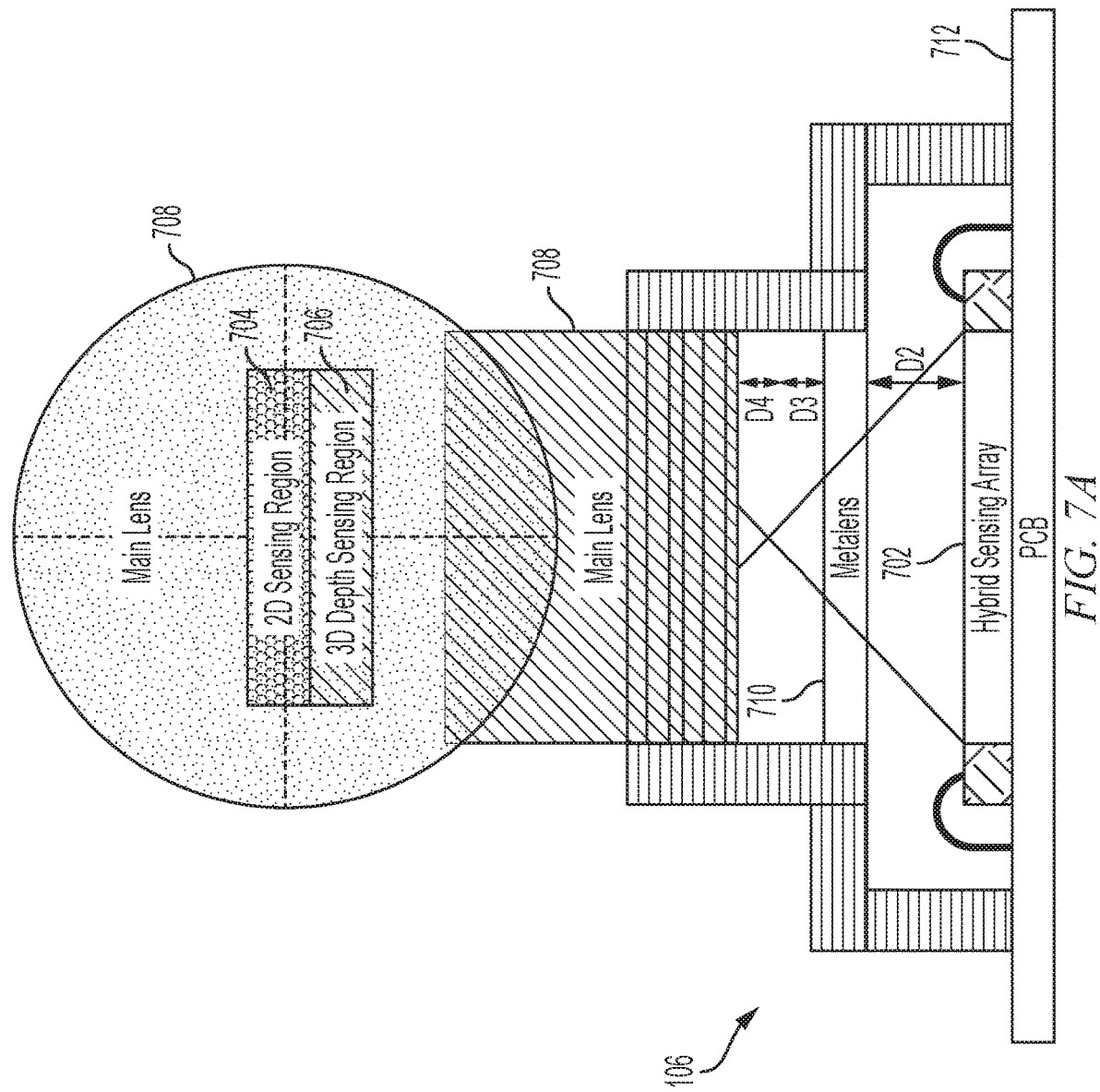
FIG. 7A is a plan view and a cross-sectional view of a hybrid sensor, according to one or more embodiments of the present disclosure.
Figure 7B:
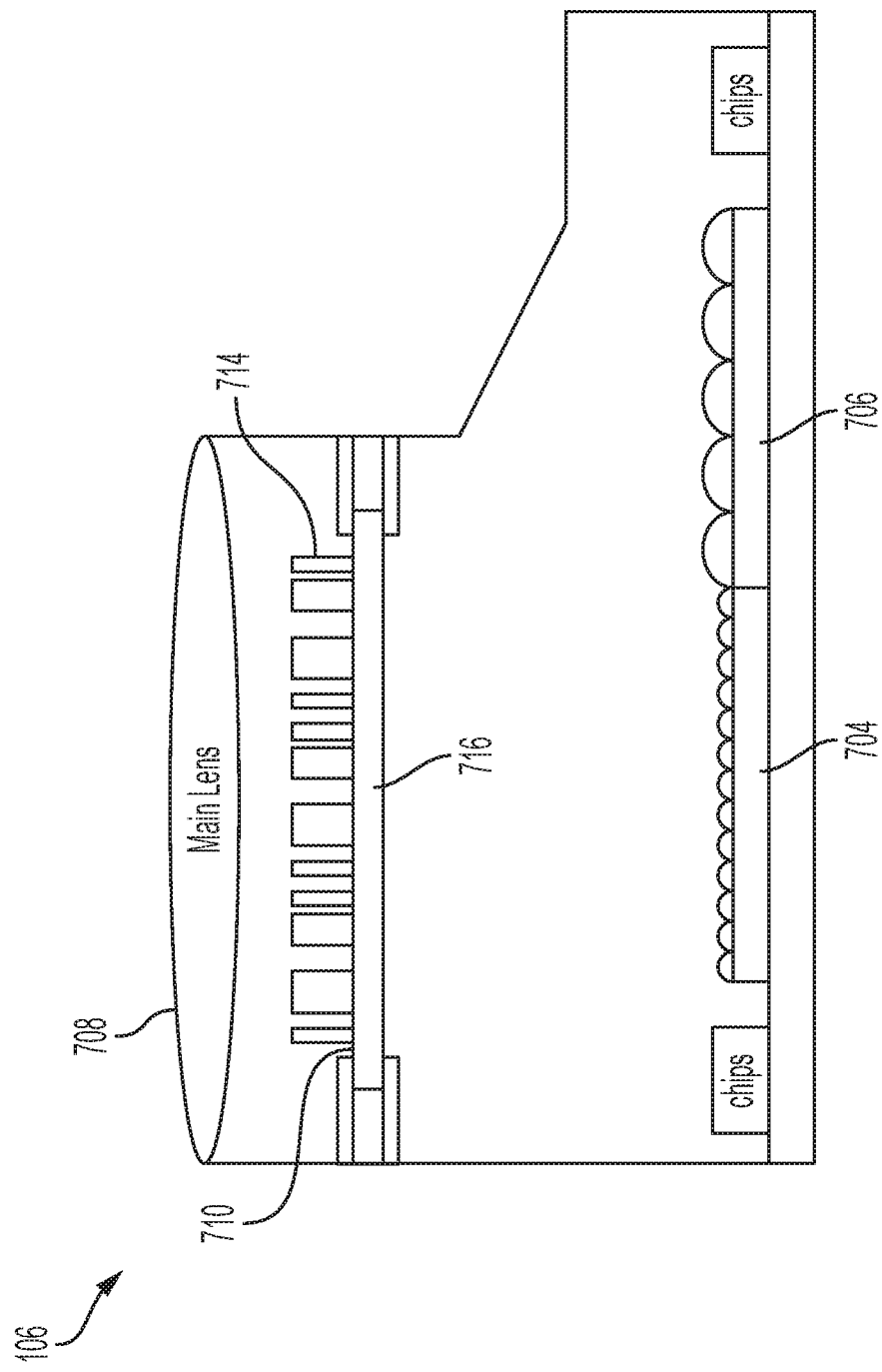
FIG. 7B is a cross-sectional view of a hybrid sensor, according to one or more embodiments of the present disclosure.

FIG. 7A is a plan view and a cross-sectional view of a hybrid sensor 106, according to one or more embodiments of the present disclosure. FIG. 7B is a cross-sectional view of a hybrid sensor 106, according to one or more embodiments of the present disclosure.

Referring to FIGS. 7A-7B, in one or more embodiments, a hybrid sensor 106 may include a hybrid sensing array 702, a main lens 708, a global metalens 710, and a printed circuit board 712 ("PCB"). The hybrid sensing array 702 may be positioned on the PCB 712 and include a 2D sensing region 704 and a 3D depth sensing region 706 in a side-by-side arrangement.

As shown in FIG. 7A, a main lens 708 and a global metalens 710 may cover or overlap the hybrid sensing array 702 such that the main lens 708 and the global metalens 710 are centered over the 2D sensing region 704. In one or more embodiments, the entire 2D sensing region 704 of the hybrid sensing array 702 and the entire 3D depth sensing region of the hybrid sensing array may overlap the global metalens 710 and the main lens 708. However, the present disclosure is not limited thereto. For example, as shown in FIG. 7B, the entire 2D sensing region 704 of the hybrid sensing array 702 may overlap the global metalens 710 and the main lens 708 while less than the entire 3D depth sensing region 706 may overlap with the global metalens 710 and the main lens 708.

In one or more embodiments, the global metalens 710 may be between the main lens 708 and the 2D sensing region 704 such that external light incident on the main lens 708 passes through the global metalens 710 prior to being detected by the hybrid sensing array 702. Light passing through the global metalens 710 may be directed (or focused) by one or more nanostructures 714 positioned on a transparent substrate (e.g., a glass substrate) 716. Each of the one or more nanostructures may direct (or focus) visible light towards the 2D sensing region 704 or direct (or focus) NIR light towards the 3D depth sensing region 706. Because light detected by the 2D sensing region 704 and the 3D depth sensing passes through a shared main lens 708, both the 2D sensing region 704 and the 3D depth sensing region 706 have the same FOV. Accordingly, centering the main lens 708 and the global metalens 710 to cover the 2D sensing region 704 assists in providing a high-resolution 2D image that may be augmented with 3D depth information as discussed in more detail below.

As shown in FIG. 7A, the planar area and distances D2, D3, and D4 between the main lens 708, global metalens 710, and hybrid sensing array 702 may be set such that each sensing pixel of the hybrid sensing array 702 may be exposed to directed (or focused) light. The focal point of the main lens 708 may be spaced apart from the main lens 708 by a distance D4 and may be spaced apart from the global metalens 710 by a distance D3. In one or more embodiments, the focal point of the main lens may be between the main lens 708 and the global metalens 710. Further, the hybrid sensing array 702 may be spaced apart from the global metalens 710 by a distance D2 such that each of the sensing pixels of the hybrid sensing array 702 may detect directed (or focused) light from the main lens 708 and/or the global metalens 710.

Accordingly, a compact, monolithic hybrid sensor 106 is provided with a main lens 708 and a global metalens 710 that covers or overlaps the hybrid sensing array 702 to provide 2D image data and 3D depth information from a shared FOV. Further, the side-by-side arrangement of the 2D sensing region 704 and the 3D depth sensing region 706 assists in providing a high resolution 2D image because sensing pixels of the 3D depth sensing region 706 do not interrupt (or displace) sensing pixels of the 2D sensing region 704 leading to "missing" sensing pixels of the 2D sensing region 704.

Figure 8:
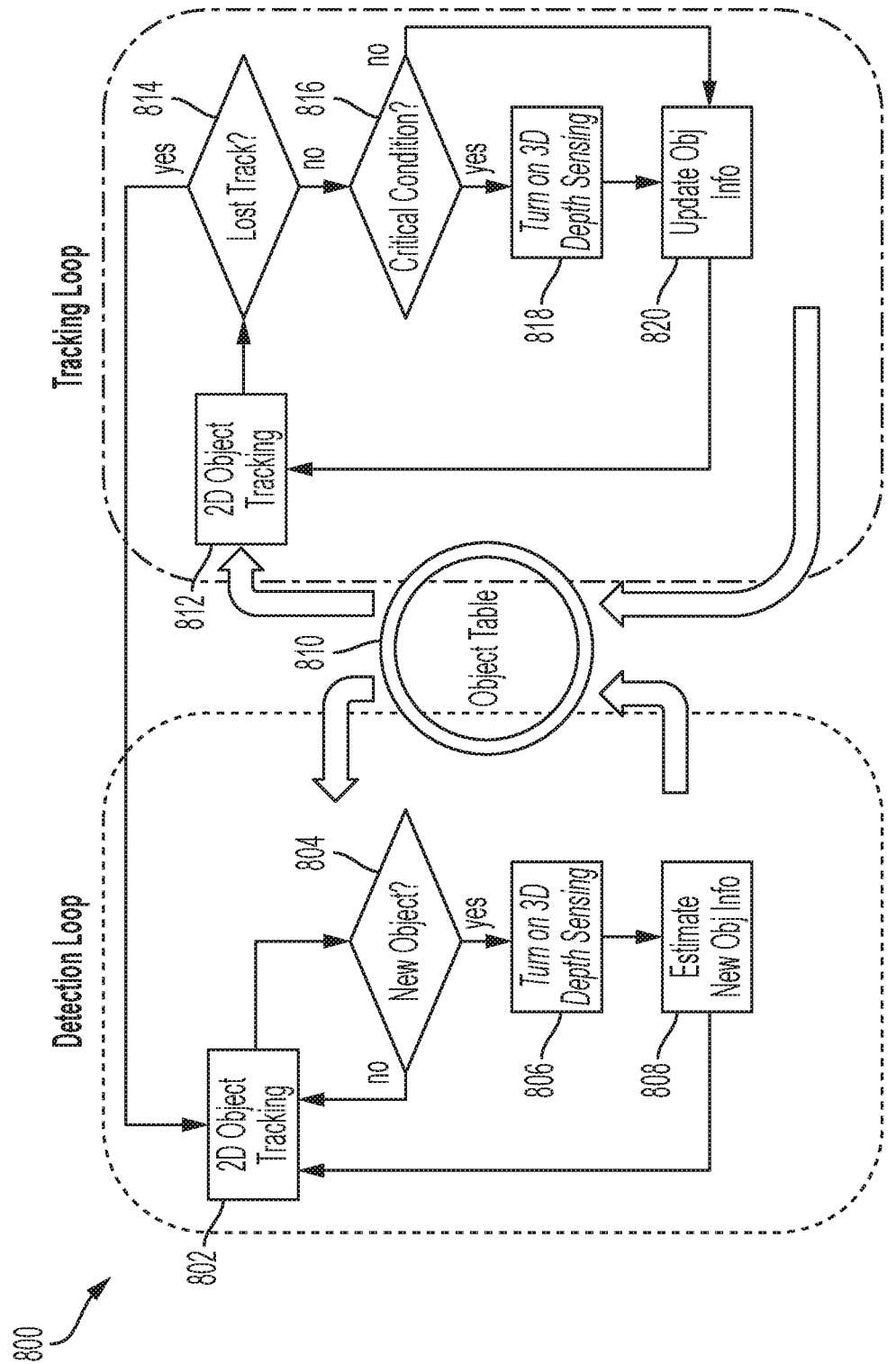
FIG. 8 is a flow chart of a method for object detection and tracking, according to one or more embodiments of the present disclosure.

FIG. 8 is a flow chart of a method 800 for object detection and tracking, according to one or more embodiments of the present disclosure.

Referring to FIG. 8, an object detector 212 of the processing circuit 204 may use a neural-network based object detection system to detect and track objects in 2D image data based on data from the 2D sensing region.

In one or more embodiments, the object detector 212 may detect an object using 2D image data (802). The object detector 212 may determine whether the object detected is a new object (804). For example, the object detector 212 may determine whether the object is a new object based on whether the object detected in the 2D image data is already stored in an object table 810.

If the object is an object that was previously or already detected, then the object detector 212 continues to detect other objects in the image as part of the object detection loop. If the object is a new object that was not previously or already detected in the current 2D image data, then the object detector 212 works with the ROI controller 210 of the processing circuit 204 to activate the 3D depth sensing region. For example, the object detector 212 may detect an object (e.g., a pedestrian) using the 2D image data (802), and identify coordinates of that object (e.g., the pedestrian) in the 2D image data. Based on the coordinates of the object in the 2D image data, the ROI controller 210 may activate portions of the light source 104 (e.g., portions of an array of VCSELs) to illuminate the object (e.g., the pedestrian) in the real-world. In one or more embodiments, the ROI controller 210 may send signals to the sensing circuit 202 to select specific sensing pixels (e.g., one or more sensing pixels including SPADs) of the 3D depth sensing region according to the coordinates of the object identified from the 2D image. In one or more embodiments, the sensing pixels of the 3D depth sensing region driven by the sensing circuit 202 may be adjacent or proximate to the sensing pixels of the 2D sensing region that provide sensing signals corresponding to the 2D image data of the object (e.g., the pedestrian).

Accordingly, 3D depth sensing information may be collected by the hybrid sensor 106 (i.e., 3D depth sensing is turned on (806)). By selectively turning on 3D depth sensing in response to a new object, battery power usage may be reduced and less computation resources may be used. Based on a combination of the 2D image data and the 3D depth information, the object detector 212 may estimate information regarding the new object (808) such as shape, identity, and/or 2D size information according to 2D sensing information and depth according to 3D depth sensing information, and store the estimated information in the object table 810 before returning to detecting other objects (802) thereby completing a detection loop. In one or more embodiments, the object table 810 may indicate whether the object is an OOI which should be tracked.

Accordingly, in one or more embodiments, the object detector 212 may track an object identified by the object table based on the detection loop. For example, for ADAS or autonomous vehicle applications, a tree and a pedestrian may be identified by the detection loop. In this case, the object detector 212 may determine that a tree in the background should not be tracked. On the other hand, the object detector 212 may determine that a pedestrian should be tracked (e.g., because a pedestrian may move). Accordingly, the pedestrian identified in the 2D image data may be tracked as an OOI using ROI sensing. Although the example of a tree and pedestrian is provided, the present disclosure is not limited thereto. Depending on the application, any object may be designated for tracking based on several factors (e.g., location, importance, distance, mobility, and the like).

In one or more embodiments, the object detector 212 may continually track (e.g., track the location of) the object in the 2D image data (812). If the object detector 212 loses track of the tracked object (e.g., the tracked object exits the FOV or an error occurs) in the 2D image data (814), then the object tracking ends until the detection loop detects another object or the same object again to track (i.e., the object detector 212 exits the tracking loop and returns to the detection loop). Therefore, in the detection loop, there is a possibility that the tracked object which was lost will be reidentified and tracked again to correct any possible errors.

If the object detector 212 is tracking the object (e.g., an OOI) and a critical condition is encountered (e.g., a condition where the OOI is in front in an ADAS application) (816), the object detector 212 may work with the ROI controller 210 of the processing circuit 204 to activate the 3D depth sensing region. The ROI controller 210 may send signals to the sensing circuit 202 to select specific sensing pixels of the 3D depth sensing region and/or activate portions of the light source 104 (e.g., portions of an array of VCSELs) to illuminate the detected object in the real-world. Accordingly, 3D depth sensing information may be collected by the hybrid sensor 106 (i.e., 3D depth sensing is turned on (818)). By selectively turning on 3D depth sensing (818) in response to a critical condition, battery power usage may be reduced and less computational resources may be used. Based on new information from the 3D depth sensing, the object detector may augment or update the 3D depth information for the tracked object (820). In one or more embodiments, the combination of the 2D image data and the 3D depth information may also enable the object detector to reassess or update object information (820) such as shape, identity, and/or 2D size information according to 2D sensing information and depth according to 3D depth sensing information in the object table before returning to tracking the object until the tracked object is lost (814) or another critical condition is met (816).

Although the FIG. 8 is described with reference to a detection loop and a tracking loop for a single object, the present disclosure is not limited thereto. For example, a plurality of objects may be detected and tracked concurrently as desired. Further, the detection loop may be always active while the tracking loop may be active as objects may be designated by the object detector 212 for tracking (e.g., designated as an OOI). In one or more embodiments, all of the objects detected by the object detector 212 may be tracked and, in other embodiments, less than all of the objects detected by the object detector 212 may be tracked as desired.

Figure 9:
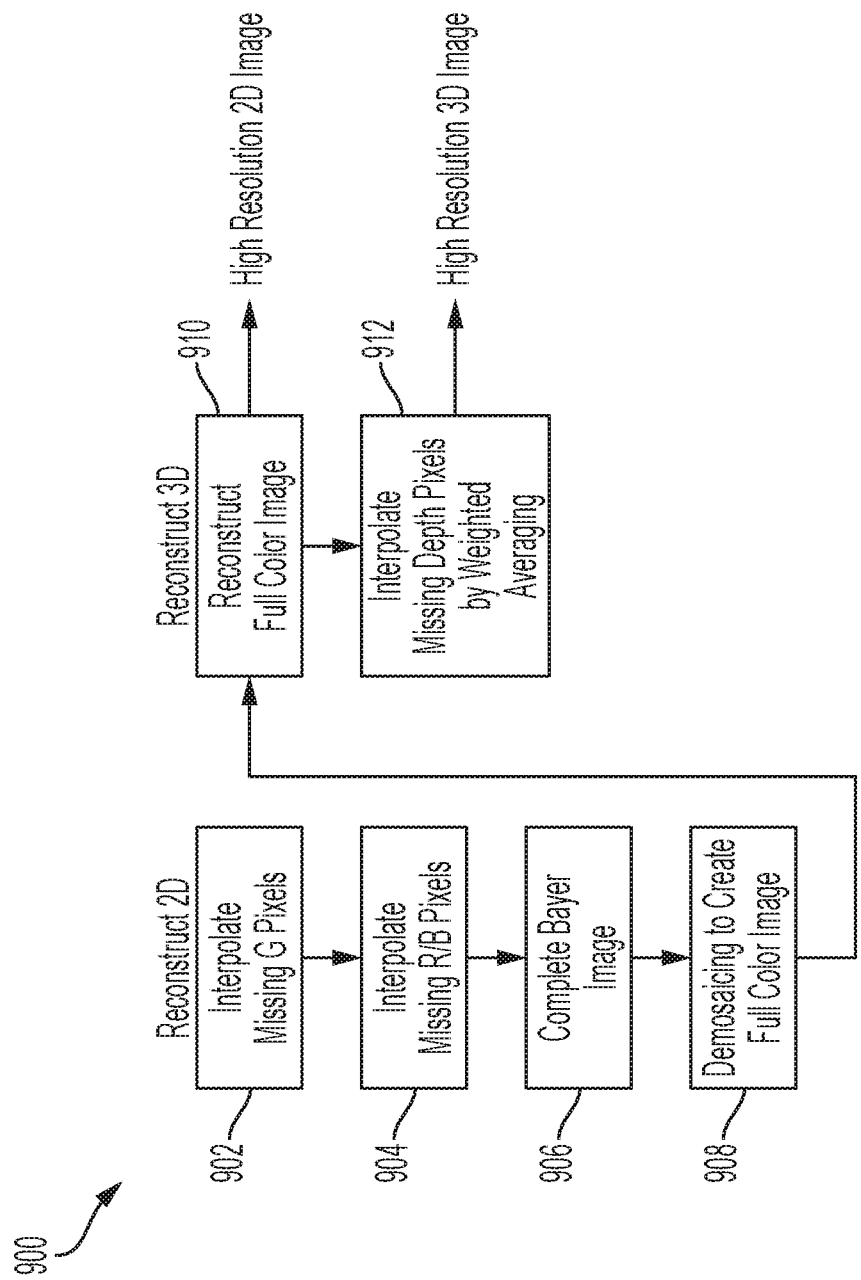
FIG. 9 is a flow chart of a method for providing a high resolution 2D image and a high resolution 3D image, according to one or more embodiments of the present disclosure.

FIG. 9 is a flow chart 900 of a method for providing a high resolution 2D image and a high resolution 3D image, according to one or more embodiments of the present disclosure.

Referring to FIG. 9, according to one or more example embodiments of the present disclosure, an image signal processor 214 may provide or reconstruct 2D and/or 3D images using data from the sensing circuit 202.

In one or more embodiments, the image signal processor 214 may provide or reconstruct a 2D image based on the arrangement of the sensing pixels of the 2D sensing region and the sensing pixels of the 3D depth sensing region. For example, when sensing pixels of the 2D sensing region are interwoven with sensing pixels of the 3D depth sensing region, the 2D image data may be missing patches of 2D image data because the sensing pixel of the 3D depth sensing region occupies a region of the hybrid sensing array that interrupts (or displaces) sensing pixel rows and/or sensing pixel columns of the 2D sensing region. Therefore, 2D image data generating by the 2D sensing region has missing pixels (e.g., one or more missing green pixels, one or more missing red pixels, and/or one or more missing blue pixels). However, the present disclosure is not limited thereto. For example, in one or more embodiments, any sensing pixels interrupted (or displaced) by a sensing pixel of the 3D depth sensing region may result in "missing" pixels, and therefore, missing pixels can be of any color and/or type depending on the sensing pixels of the 2D sensing region that may be interrupted (or displaced) by a sensing pixel of the 3D depth sensing region.

In the illustrated embodiment, in response to 2D image data from the 2D sensing region, the image signal processor 214 may interpolate missing green pixels (902), and interpolate missing red and blue pixels (904). In response to interpolating the missing pixels, the image signal processor 214 may complete a Bayer image (906). In response to completing the Bayer image, the image signal processor 214 may use a demosaicing algorithm to reconstruct a full color image (908). Accordingly, a full color image may be reconstructed for use in various applications (910) (e.g., use by the object detector 212 of the processing circuit 204).

Although reconstruction of the 2D image is described with reference to interpolating missing pixels (902, 904), depending on the embodiment of the present disclosure, interpolating missing pixels may be skipped (902, 904). For example, in the case where the sensing pixels of the 2D sensing region and the sensing pixels of the 3D depth sensing region are in a side-by-side arrangement as shown in the embodiments of FIGS. 2B, 3I, 6B, and 7A-7B, there may be no missing pixels to interpolate, and therefore, interpolating missing pixels may be skipped. In other words, the embodiments of FIGS. 2B, 3I, 6B, and 7A-7B may start from step 910.

In one or more embodiments, in response to reconstructing a full color image, the image signal processor 214 may interpolate missing depth pixels by weighted averaging (912). In other words, 3D depth information from the 3D depth sensing region may not have the same resolution as the 2D image data, and therefore, missing 3D depth information may be determined based on interpolation using sensed 3D depth information and weighted averaging. Accordingly, a high resolution 3D image may be provided including both the high resolution 2D image as a foundation or base and 3D depth information augmenting or updating the high resolution 2D image.

Accordingly, as disclosed herein, embodiments of the present disclosure provide high resolution 2D and 3D images based on a hybrid sensing array including a 2D sensing region and a 3D depth sensing region with a shared FOV. Further, systems and methods of one or more embodiments of the present disclosure provide ROI sensing capabilities based on object detection and tracking algorithms to save on power and computational resources.

In the drawings, the relative sizes of elements, layers, and regions may be exaggerated and/or simplified for clarity.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," and "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively.

As used herein, the terms "substantially", "about", and similar terms are used as terms of approximation and not as terms of degree, and are intended to account for the inherent deviations in measured or calculated values that would be recognized by those of ordinary skill in the art.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Although some example embodiments have been described, those skilled in the art will readily appreciate that various modifications are possible in the example embodiments without departing from the spirit and scope of the present disclosure. It will be understood that descriptions of features or aspects within each embodiment should typically be considered as available for other similar features or aspects in other embodiments, unless otherwise described. Therefore, it is to be understood that the foregoing is illustrative of various example embodiments and is not to be construed as limited to the specific example embodiments disclosed herein, and that various modifications to the disclosed example embodiments, as well as other example embodiments, are intended to be included within the spirit and scope of the present disclosure as defined in the appended claims, and their equivalents.

What is claimed is:

1. A 3D sensing system comprising:
a light source configured to emit light;
a hybrid sensing array comprising a 2D sensing region configured to detect ambient light reflected from an object and a 3D depth sensing region configured to detect the light emitted by the light source and reflected from the object;
a metalens on the hybrid sensing array, the metalens comprising a first nanostructure and a second nanostructure, the first nanostructure being configured to direct the ambient light reflected from the object towards the 2D sensing region, and the second nanostructure being configured to direct the light emitted by the light source and reflected from the object towards the 3D depth sensing region; and
a processing circuit configured to combine 2D image information provided by the 2D sensing region and 3D information provided by the 3D depth sensing region to generate a combined 3D image.

2. The 3D sensing system of claim 1, wherein the processing circuit is further configured to:
determine 2D image information of the object based on the 2D sensing region;
determine 3D depth information of the object based on the 3D depth sensing region; and
update the 2D image information of the object with the 3D depth information.

3. The 3D sensing system of claim 1, further comprising a row decoder and a column amplifier, the row decoder and the column amplifier being stacked below the hybrid sensing array.

4. The 3D sensing system of claim 1, wherein the metalens is circular, cylindrical, rectangular, or square in shape and is polarization-independent.

5. The 3D sensing system of claim 1, wherein the 2D sensing region comprises one or more photodiodes and the 3D depth sensing region comprises one or more APDs or SPADs.

6. The 3D sensing system of claim 1, wherein the metalens is configured to direct NIR light to the 3D depth sensing region.

7. The 3D sensing system of claim 1, wherein the processing circuit is further configured to:
   detect the object based on the 2D image information;
   generate a region of interest based on coordinates of the object in the 2D image information; and
   illuminate the region of interest using the light source.

8. The 3D sensing system of claim 7, wherein the processing circuit is further configured to:
   determine an identity of the object based on the 2D image information and 3D depth information;
   track the object based on 2D image information; and
   update the 2D image information with 3D depth information in response to a critical condition.

9. A method of providing an image based on a hybrid sensing array, the method comprising:
   emitting light from a light source;
   detecting, by a 2D sensing region of the hybrid sensing array, ambient light reflected from an object;
   detecting, by a 3D depth sensing region of the hybrid sensing array, the light emitted by the light source and reflected from the object towards the 3D depth sensing region;
   directing, by a first nanostructure of a metalens on the hybrid sensing array, ambient light towards the 2D sensing region;
   directing, by a second nanostructure of the metalens of the hybrid sensing array, light emitted by the light source and reflected from the object towards the 3D depth sensing region; and
   combining, by a processing circuit, 2D image information provided by the 2D sensing region and 3D information provided by the 3D depth sensing region to generate a combined 3D image.

10. The method of claim 9, the method further comprising
    determining, by the processing circuit, 2D image information of the object based on the 2D sensing region;
    determining, by the processing circuit, 3D depth information of the object based on the 3D depth sensing region; and
    updating, by the processing circuit, the 2D image information of the object with the 3D depth information.

11. The method of claim 9, wherein the hybrid sensing array detecting the ambient light and the light emitted by the light source is stacked above a row decoder and a column amplifier.

12. The method of claim 9, wherein the metalens directing ambient light towards the 2D sensing region and directing light emitted by the light source and reflected from the object towards the 3D depth sensing region is circular, cylindrical, rectangular, or square in shape and is polarization-independent.

13. The method of claim 9, wherein the 2D sensing region comprises one or more photodiodes to detect ambient light and the 3D depth sensing region comprises APDs or SPADs to detect the light emitted by the light source and reflected off the object.

14. The method of claim 9, wherein the directing, by the metalens on the hybrid sensing array, ambient light towards the 2D sensing region comprises directing visible light towards the 2D sensing region, and
    wherein the directing, by the metalens of the hybrid sensing array, light emitted by the light source and reflected from the object towards the 3D depth sensing region comprises directing NIR light towards the 3D depth sensing region.

15. The method of claim 9, the method further comprising
    detecting, by the processing circuit, the object based on the 2D image information;
    generating, by the processing circuit, a region of interest based on coordinates of the object in the 2D image information; and
    illuminating, by the processing circuit, the region of interest using the light source.

16. The method of claim 9, the method further comprising
    determining, by the processing circuit, an identity of the object based on the 2D image information and 3D depth information;
    tracking, by the processing circuit, the object based on 2D image information; and
    updating, by the processing circuit, the 2D image information with 3D depth information in response to a critical condition.

17. A 3D sensing system comprising:
    a light source configured to emit light;
    a 2D sensing region to detect visible light reflected from an object;
    a 3D depth sensing region to detect near infrared light reflected from the object;
    a metalens covering the 2D sensing region, the metalens comprising a first nanostructure and a second nanostructure, the first nanostructure being configured to direct visible light reflected from the object toward the 2D sensing region, and the second nanostructure being configured to direct the light emitted by the light source and reflected from the object towards the 3D depth sensing region; and
    a processing circuit configured to:
      determine 2D image information of the object based on the 2D sensing region;
      determine 3D depth information of the object based on the 3D depth sensing region; and
      update the 2D image information of the object with the 3D depth information.

18. The 3D sensing system of claim 17, further comprising a row decoder and a column amplifier, the row decoder and the column amplifier being stacked below the 2D sensing region and the 3D depth sensing region.

19. The 3D sensing system of claim 17, wherein the metalens is circular, cylindrical, rectangular, or square in shape and is polarization-independent.

20. The 3D sensing system of claim 17, wherein the 2D sensing region comprises one or more photodiodes and the 3D depth sensing region comprises one or more SPADs or APDs.

* * * * *